(12) United States Patent
Wang et al.

(10) Patent No.: US 11,946,004 B2
(45) Date of Patent: Apr. 2, 2024

(54) ATMOSPHERIC-VACUUM HEAT EXCHANGE SYSTEM HAVING COIL-WOUND HEAT EXCHANGERS, AND HEAT EXCHANGE PROCESS

(71) Applicant: Zhenhai Petrochemical Jianan Engineering Co., Ltd., Ningbo (CN)

(72) Inventors: Jianliang Wang, Ningbo (CN); Xianan Zhang, Ningbo (CN); Huili Ma, Ningbo (CN); Xingmiao Hu, Ningbo (CN); Hongliang Ren, Ningbo (CN); Yu Wang, Ningbo (CN); Jiang Tao, Ningbo (CN); Jiaoyue Cui, Ningbo (CN)

(73) Assignee: Zhenhai Petrochemical Jianan Engineering Co., Ltd., Ningbo (CN)

( * ) Notice: Subject to any disclaimer, the term of this patent is extended or adjusted under 35 U.S.C. 154(b) by 339 days.

(21) Appl. No.: 17/597,840

(22) PCT Filed: Apr. 1, 2020

(86) PCT No.: PCT/CN2020/082663
§ 371 (c)(1),
(2) Date: Jan. 26, 2022

(87) PCT Pub. No.: WO2021/017514
PCT Pub. Date: Feb. 4, 2021

(65) Prior Publication Data
US 2022/0315842 A1 Oct. 6, 2022

(30) Foreign Application Priority Data
Jul. 29, 2019 (CN) .......................... 201910687963.6

(51) Int. Cl.
*C10G 7/00* (2006.01)
*B01D 3/06* (2006.01)
(Continued)

(52) U.S. Cl.
CPC ................ *C10G 7/00* (2013.01); *B01D 3/06* (2013.01); *B01D 3/10* (2013.01); *B01D 3/143* (2013.01);
(Continued)

(58) Field of Classification Search
CPC ...... F28F 27/00; F28F 9/24; F28F 1/06; F28F 2009/226; F28F 2200/00; F28F 9/00;
(Continued)

(56) References Cited

FOREIGN PATENT DOCUMENTS

CN 103344139 A * 10/2013
CN 104479735 A * 4/2015

* cited by examiner

*Primary Examiner* — Randy Boyer
*Assistant Examiner* — Juan C Valencia
(74) *Attorney, Agent, or Firm* — Wang Law Firm, Inc.

(57) ABSTRACT

An atmospheric-vacuum heat exchange system with a winding-tube heat exchanger, has a first and second heat exchanging group; a primary distillation tower (4) or flash tower; an atmospheric furnace (5); an atmospheric tower (6); a vacuum furnace (7) and a vacuum tower (8); each winding-tube heat exchanger has a shell-pass cylinder (370), a first and second shell-pass connecting tube (371,372), a first and second tube plate (330,340), a plurality of first and second tube box (310,320), a plurality of heat exchange tubes (360) spirally wounded with multiple spiral tube layers; the number of the first and second tube box (310, 320) are respectively N, and each spiral tube layer has N group(s) of the wounded heat exchange tubes (360), N is a natural number greater than or equal to 1. The loss of heat exchanger is reduced.

9 Claims, 8 Drawing Sheets

(51) Int. Cl.
*B01D 3/10* (2006.01)
*B01D 3/14* (2006.01)
*F28D 7/02* (2006.01)
*F28D 7/16* (2006.01)
*F28D 21/00* (2006.01)

(52) U.S. Cl.
CPC ........... *F28D 7/024* (2013.01); *F28D 7/1676* (2013.01); *C10G 2300/107* (2013.01); *C10G 2300/1077* (2013.01); *C10G 2300/4006* (2013.01); *C10G 2300/4081* (2013.01); *F28D 2021/0059* (2013.01)

(58) Field of Classification Search
CPC .... F28F 9/22; F28D 7/024; F28D 7/16; F28D 7/163; F28D 7/1692; F28D 7/1676; F28D 2021/0059; F28D 7/02; F28G 1/12; F28G 15/00; C10G 7/00; C10G 2300/107; C10G 2300/1077; C10G 2300/4006; C10G 2300/4081; B01D 3/06; B01D 3/10; B01D 3/143
See application file for complete search history.

ATMOSPHERIC-VACUUM HEAT EXCHANGE SYSTEM HAVING COIL-WOUND HEAT EXCHANGERS, AND HEAT EXCHANGE PROCESS

TECHNICAL FIELD OF THE INVENTION

The present invention belongs to the technical field of oil refining devices and processes, and particularly relates to an atmospheric-vacuum heat exchange system with a winding-tube heat exchanger, and a heat exchange process thereof.

BACKGROUND OF THE INVENTION

An atmospheric-vacuum heat exchanger system generally has an atmospheric distillation device, a vacuum distillation device and a heat exchange device, mainly comprises desalting and dewatering of crude oil, atmospheric distillation, vacuum distillation and other processes. At present, ordinary heat exchangers such as plate heat exchangers and shell-and-tube heat exchangers are mostly used as heat exchange devices in the atmospheric-vacuum heat exchange systems. A large number of these ordinary heat exchangers are required, and these ordinary heat exchangers have complicated tubing and large floor space.

For example, a Chinese Invention application CN107057747A disclosed a highly-efficient and energy-saving atmospheric-vacuum deep distillation process based on clear cutting (Application No. CN201610978721.9), wherein the used device comprises a plurality of heat exchangers, two flash towers, an atmospheric furnace, an atmospheric tower, a vacuum furnace and a vacuum tower; the crude oil after a first stage of heat exchange passes through a deep distillation and extraction tower plate on the bottoms of the flash towers so that the content of the primary fraction in the oil on the bottoms of the flash towers that is lower than the initial fraction feed is decreased to less than 1% to 3%; and, the oil on the bottoms of the flash towers after a second stage of heat exchange passes through the flash towers before the atmospheric furnace so that the content of the primary fraction in the oil on the bottoms of the flash towers that is lower than the temperature of the initial fraction feed is decreased to less than 3% to 5%, and the primary fraction successively passes through the atmospheric furnace, the atmospheric tower, the vacuum furnace and the vacuum tower to obtain oil products having different components. Although this process can clearly cut the crude oil, the used heat exchangers are ordinary heat exchangers with low heat exchange efficiency, and this process can be realized by providing two flash towers in the device.

In order to simplify heat exchange systems, the applicant replaces ordinary heat exchangers with multi-stream winding-tube heat exchangers to simplify and optimize heat exchange systems, specifically referring to a Chinese Invention Patent CN104479735B entitled HEAT EXCHANGE SYSTEM AND PROCESS FOR ATMOSPHERIC-VACUUM DEVICE (Patent No. CN201410802568.5). Although the number of heat exchange devices in the heat exchange system is greatly decreased, this heat exchange system is mainly used for crude oil atmospheric distillation devices without vacuum towers at present.

In addition, when ordinary heat exchangers are used, although a large number of ordinary heat exchangers are required, when a certain heat exchange device is failed, it is easy to switch and pick out the failed device, it is convenient to handle the failed device, and the loss of heat recovery is low. However, when multi-stream winding-tube heat exchangers are used, although the number of heat exchangers can be decreased, when a heat exchange devices is failed or needs to be cleaned, it is generally necessary to shut down the device, and the heat exchange efficiency will be affected.

SUMMARY OF THE INVENTION

It is a first object of the present invention to provide an atmospheric-vacuum heat exchange system with a winding-tube heat exchanger, which can simply and quickly handle failed heat exchange devices and reduce the heat exchange loss.

It is a second object of the present invention to provide an atmospheric-vacuum heat exchange system with a winding-tube heat exchanger, which has simple structure and low loss during heat exchange, and can reduce equipment investment and floor space.

It is a third object of the present invention to provide a heat exchange process for exchanging heat by using the atmospheric-vacuum heat exchange system.

For achieving the first object, the atmospheric-vacuum heat exchange system with a winding-tube exchanger comprises a first heat exchanging group with a crude oil output for performing primary heat exchange on crude oil; a primary distillation tower or flash tower, for performing primary distillation on the crude oil, connected to the crude oil output of the first heat exchanging group; a second heat exchanging group for performing secondary heat exchange on a primary bottom oil or flash bottom oil obtained after primary distillation being connected to a bottom of the primary distillation tower or flash tower, having a primary bottom oil output or a flash bottom oil output; an atmospheric furnace, connected to the primary bottom oil output or flash bottom oil output of the second heat exchanging group; an atmospheric tower; a vacuum furnace; and a vacuum tower connected to the vacuum furnace; the atmospheric tower is connected between the atmospheric furnace and the vacuum furnace, the vacuum furnace is connected between the atmospheric tower and the vacuum tower; the crude oil or the primary bottom oil or flash bottom oil from the primary distillation tower or flash tower or/and the atmospheric tower or/and the vacuum tower is inputted into the first heat exchanging group and the second heat exchanging group according to required working conditions, so as to heat the crude oil, and to heat the primary bottom oil or flash bottom oil;

heat exchangers in the first heat exchanging group and/or the second heat exchanging group are winding-tube heat exchangers, each winding-tube heat exchanger comprises a shell-pass cylinder having two ends; a first shell-pass connecting tube and a second shell-pass connecting tube both connected to the shell-pass cylinder; a first tube plate and a second tube plate respectively attached to each end of the shell-pass cylinder; a plurality of first tube box connected to the first tube plate; a plurality of second tube box connected to the second tube plate; a plurality of heat exchange tubes each having two ends disposed inside the shell-pass cylinder; wherein, a shell passage for the crude oil or the primary bottom oil or flash bottom oil to flow through is formed by the first shell-pass connecting tube, the second shell-pass connecting tube and the shell-pass cylinder; two ends of each heat exchange tube are respectively connected to the first tube plate and the second tube plate, and respectively communicated with the corresponding first tube box and the corresponding second tube box, to form a plurality of tube passages for the crude oil or the primary bottom oil or flash bottom oil to pass through; each heat exchange tube is spirally wounded along the axial direction of the shell-pass cylinder with multiple spiral tube layers, and each spiral tube layer has a plurality of wounded heat exchanging tubes;

the number of the plurality of first tube box is N, and each first tube box in the plurality of tube box is independently disposed on the first tube plate;

the number of the plurality of second tube box is N, and each second tube box in the plurality of second box is corresponding to the first tube box and independently disposed on the second tube plate;

each spiral tube layer has N group(s) of the wounded heat exchange tubes, and two ends of each group of the heat exchange tubes are respectively connected to the corresponding first and second tube boxes;

N is a natural number greater than or equal to 1.

Preferably, each first and second tube box has an opening, and a plurality of valves are respectively disposed adjacent to the opening of each first and second tube box, to adjust the flow and shut off the medium.

Preferably, a plurality of flow distribution devices are respectively disposed adjacent to the opening of each first and second tube box, and each flow distribution device comprises three or four flow distribution passages and the valves, each valve is disposed on each flow distribution passage. In this way, each fluid stream is divided into 3 to 4 tube passages before entering or leaving the heat exchanger, and a valve is designed on each tube passage. During normal operation, 2 to 3 tube passages of a certain stream are used, and one tube passage is reserved for standby. When an internal leakage occurs in one of the used tube passages, the valves at the inlet and outlet of the internally leaked tube passage are turned off, and the valves at the inlet and outlet of the standby tube passage are turned on. Or, all tube passages are used. When an internal leakage occurs in a certain tube passage, the valves at the inlet and outlet of this internally leaked tube passage are turned off, so that the loss of heat exchange can be reduced.

The tube boxes on the same side of the tube plate can be independently sleeved inside and outside, that is, large tube boxes are sleeved outside; and, the tube boxes operate independently without interference. However, in order to facilitate the mounting and cleaning of the tube boxes, preferably, the plurality of first tube box is uniformly distributed on the first tube plate, and the plurality of second tube box is uniformly distributed on the second tube plate.

Preferably, the heat exchange tubes in each spiral tube layer are uniformly divided into N groups.

Preferably, after the heat exchange tubes in each spiral tube layer are divided into N groups, each group of heat exchange tubes is uniformly distributed in the same spiral tube layer. Thus, the heat exchange tubes in each layer are uniformly distributed in the tube boxes. In this way, when some of the first and second tube boxes are closed, the heat exchange tubes in the remaining operating first and second tube boxes are still uniformly distributed within the shell-pass cylinder, so that the heat transfer will not be affected by the deviation of the shell-pass medium since some of the tube boxes are stopped.

For achieving the second object, the winding-tube heat exchangers (the heat exchangers in the first heat exchanging group and/or the second heat exchanging group) have a plurality of single-stream winding-tube heat exchangers, two-stream winding-tube heat exchangers and three-stream winding-tube heat exchangers; the single-stream winding-tube heat exchangers are heat exchangers having one shell passage and one tube passage when N=1; the two-stream winding-tube heat exchangers are heat exchangers having one shell passage and two tube passages when N=2; and the three-stream winding-tube heat exchangers are heat exchangers having one shell passage and three tube passages when N=3.

Preferably, the atmospheric-vacuum heat exchange system further comprises an electric desalting unit, and the connections among the first heat exchanging group, the electric desalting unit, the primary distillation tower or flash tower, the second heat exchanging group, the atmospheric furnace, the atmospheric tower, the vacuum furnace and the vacuum tower are as follows:

the first heat exchanging group comprises a first three-stream winding-tube heat exchanger, a second three-stream winding-tube heat exchanger, a third three-stream winding-tube heat exchanger, a first single-stream winding-tube heat exchanger, a first two-stream winding-tube heat exchanger, a second two-stream winding-tube heat exchanger, a third two-stream winding-tube heat exchanger, a fourth two-stream winding-tube heat exchanger and a fourth three-stream winding-tube heat exchanger;

the second heat exchanging group comprises a fifth two-stream winding-tube heat exchanger, a fifth three-stream winding-tube heat exchanger and a second single-stream winding-tube heat exchanger;

a pipe used for feeding the crude oil is divided into two sections, the first section of the pipe is successively connected to the shell passage of the first three-stream winding-tube heat exchanger and the shell passage of the second three-stream winding-tube heat exchanger, and the second section of the pipe is successively connected to the shell passage of the third three-stream winding-tube heat exchanger, the shell passage of the first single-stream winding-tube heat exchanger and the shell passage of the first two-stream winding-tube heat exchanger; the pipes from the shell passage of the second three-stream winding-tube heat exchanger and the shell passage of the first two-stream winding-tube heat exchanger are merged to form one pipe and then connected to the electric desalting unit; the pipe from the electric desalting unit is divided into two pipes, the first pipe is successively connected to the shell passage of the second two-stream winding-tube heat exchanger and the shell passage of the third two-stream winding-tube heat exchanger, and the second pipe is successively connected to the shell passage of the fourth two-stream winding-tube heat exchanger and the shell passage of the fourth three-stream winding-tube heat exchanger; the pipes from the shell of the third two-stream winding-tube heat exchanger and the shell passage of the fourth three-stream winding-tube heat exchanger are merged into one pipe and then connected to the primary distillation tower or flash tower; the pipe from the primary distillation tower or flash tower is successively connected to the shell passage of the fifth two-stream winding-tube heat exchanger, the shell passage of the fifth three-stream winding-tube heat exchanger and the shell passage of the second single-stream winding-tube heat exchanger; and the pipe from the shell passage of the second single-stream winding-tube heat exchanger is connected to the atmospheric furnace, the atmospheric tower connected between the atmospheric furnace and the vacuum furnace, the vacuum furnace connected between the atmospheric tower and the vacuum tower;

the top pipeline of the primary distillation tower or flash tower is divided into two pipes respectively connected to the tube passage of the first three-stream winding-tube heat exchanger and the tube passage of the third three-stream winding-tube heat exchanger;

a second circulating return pipeline in the middle portion of the atmospheric tower is connected to the tube passage of the fifth two-stream winding-tube heat exchanger and then returns to the atmospheric tower;

a first circulating return pipeline in the middle portion of the atmospheric tower is connected to the tube passage of the second two-stream winding-tube heat exchanger and then returns to the atmospheric tower;

a third lateral line in the middle portion of the atmospheric tower is successively connected to the tube passage of the fifth three-stream winding-tube heat exchanger, the tube passage of the fourth three-stream winding-tube heat exchanger and the tube passage of the second three-stream winding-tube heat exchanger, and then connected to the downstream;

the middle portion of the atmospheric tower is connected to an atmospheric stripping tower, a second pipeline on the bottom of the atmospheric stripping tower is successively connected to the tube passage of the fourth three-stream winding-tube heat exchanger and the tube passage of the second three-stream winding-tube heat exchanger and then connected to the downstream, and a first lateral line in the middle portion of the atmospheric stripping tower is successively connected to the tube passage of the second two-stream winding-tube heat exchanger and the tube passage of the second three-stream winding-tube heat exchanger and then connected to the downstream;

a second lateral line in the upper portion of the atmospheric tower is connected to the tube passage of the first single-stream winding-tube heat exchanger, the pipe from the first single-steam winding-tube heat exchanger is divided into two pipes, the first pipe is connected to the tube passage of the first three-stream winding-tube heat exchanger, and the second pipe is connected to the tube passage of the third three-stream winding-tube heat exchanger and then connected to the downstream;

a first pipeline on the top of the atmospheric tower is divided into two pipes respectively connected to the tube passage of the first three-stream winding-tube heat exchanger and the tube passage of the third three-stream winding-tube heat exchanger and then connected to the downstream;

a third circulating return pipeline in the lower portion of the vacuum tower is successively connected to the tube passage of the fifth three-stream winding-tube heat exchanger and the tube passage of the fifth two-stream winding-tube heat exchanger, and the pipe from the tube passage of the fifth two-stream winding-tube heat exchanger is divided into two pipes, one of which is connected to the tube passage of the fourth two-stream winding-tube heat exchanger and then connected to the downstream and the other one of which returns to the vacuum tower;

a fourth circulating return pipeline in the middle portion of the vacuum tower is successively connected to the tube passage of the fourth three-stream winding-tube heat exchanger, the tube passage of the fourth two-stream winding-tube heat exchanger and the tube passage of the first two-stream winding-tube heat exchanger, and the pipe from the tube passage of the first two-stream winding-tube heat exchanger is divided into two pipes, one of which is connected to the downstream and the other one of which returns to the vacuum tower;

a vacuum residue pipeline on the bottom of the vacuum tower is successively connected to the tube passage of the second single-stream winding-tube heat exchanger and the tube passage of the fifth three-stream winding-tube heat exchanger, and the pipe from the tube passage of the fifth three-stream winding-tube heat exchanger is divided into two pipes, one of which is connected to one tube passage of the third two-stream winding-tube heat exchanger, then to the tube passage of the first two-stream winding-tube heat exchanger and to the downstream, and the other one of which is connected to the other tube passage of the third two-stream winding-tube heat exchanger and returns to the vacuum tower.

For achieving the third object, the heat exchange process for exchanging heat by using the above atmospheric-vacuum heat exchange system comprises the following steps:

crude oil from the outside at a temperature of 20° C. to 60° C. is fed into a pipe and then divided into two parts, a first-section crude oil I and a second-section crude oil II, the mass flow ratio of the first-section crude oil I to the second-section crude oil II is 1:0.8-1.2; the first-section crude oil I firstly enters the shell passage of the first three-stream winding-tube heat exchanger and exchanges heat to 80° C. to 110° C. with primary top oil gas from the top pipeline of the primary distillation tower or flash tower at a temperature of 100° C. to 140° C., atmospheric top circulating oil from the tube passage of the first single-stream winding-tube heat exchanger at a temperature of 110° C. to 150° C. and atmospheric top oil gas from the first pipeline on the top of the atmospheric tower at a temperature of 100° C. to 150° C., the mass flow ratio of the first-section crude oil I to the atmospheric top oil gas to the atmospheric top circulating oil to the primary top oil gas being 1:0.1-0.3:0.25-0.4:0.06-0.2; the first-section crude oil I from the first three-stream winding-tube heat exchanger enters the shell passage of the second three-stream winding-tube heat exchanger and exchanges heat to 120° C. to 155° C. with atmospheric third-line oil from the tube passage of the fourth three-stream winding-tube heat exchanger at a temperature of 180° C. to 220° C., atmospheric second-line oil from the tube passage of the fourth three-stream winding-tube heat exchanger at a temperature of 160° C. to 200° C. and atmospheric first-line oil from the tube passage of the second two-stream winding-tube heat exchanger at a temperature of 130° C. to 170° C., the mass flow ratio of the first-section crude oil I to the atmospheric third-line oil to the atmospheric second-line oil to the atmospheric first-line oil is 1:0.1-0.3:0.1-0.3:0.15-0.35; the second-section crude oil II firstly enters the shell passage of the third three-stream winding-tube heat exchanger and exchanges heat to 80° C. to 110° C. with primary top oil gas from the top pipeline of the primary distillation tower or flash tower at a temperature of 100° C. to 140° C., atmospheric top circulating oil from the tube passage of the first single-stream winding-tube heat exchanger at a temperature of 110° C. to 150° C. and atmospheric top oil gas from the first pipeline on the top of the atmospheric tower at a temperature of 100° C. to 150° C., the mass flow ratio of the second-section crude oil II to the atmospheric top oil gas to the atmospheric top circulating oil to the primary top oil gas is 1:0.1-0.3:0.25-0.4:0.06-0.2; the second-section crude oil II from the third three-stream winding-tube heat exchanger enters the shell passage of the first single-stream winding-tube heat exchanger and exchanges heat to 100° C. to 130° C. with atmospheric top circulating oil from the second lateral line in the upper portion of the atmospheric tower at a temperature of 130° C. to 180° C., the mass flow ratio of the second-section crude oil II to the atmospheric top circulating oil being 1:0.5-0.8; the second-section crude oil II from the first single-stream winding-tube heat exchanger enters the shell passage of the first two-stream winding-tube heat exchanger and exchanges heat to 120° C. to 150° C. from vacuum residues from the tube passage of the third two-stream winding-tube heat exchanger at a temperature of 170° C. to 210° C. and vacuum second-line and second-medium oil from the tube passage of the fourth two-stream winding-tube heat exchanger at a temperature of 145° C. to 185° C., the mass flow ratio of the second-section crude oil II to the vacuum residues to the vacuum second-line and second-medium oil being 1:0.5-0.7:0.9-1.3; and the first-section crude oil I from the shell passage of the second three-stream winding-tube heat exchanger and the second-section oil from the shell passage of the first two-stream winding-tube heat exchanger are merged into one stream of crude oil at a temperature of 120° C. to 150° C. and then enter the electric desalting unit so that salt and water in the crude oil are removed;

the desalted crude oil from the electric desalting unit has a temperature of 120° C. to 150° C., and the mass flow ratio of the merged crude oil before entering the electric desalting unit and the desalted crude oil is 1:0.95-1.05; the desalted crude oil is divided into two parts, a first desalted crude oil I and a second desalted crude oil II, the flow mass ratio of the first desalted crude oil I to the second desalted crude oil II is 1:0.8-1.2; the first desalted crude oil I firstly enters the shell passage of the second two-stream winding-tube heat exchanger and exchanges heat to 145° C. to 185° C. with atmospheric first-line oil from the first lateral line in the middle portion of the atmospheric stripping tower at a temperature of 170° C. to 210° C. and atmospheric first-medium oil from the first circulating return pipeline in the middle portion of the atmospheric tower at a temperature of 210° C. to 250° C., the mass flow ratio of the first desalted crude oil I to the atmospheric first-line oil to the atmospheric first-medium oil is 1:0.1-0.3:0.2-0.4; the first desalted crude oil I from the second two-stream winding-tube heat exchanger enters the shell passage of the third two-stream winding-tube heat exchanger and exchanges heat to 190° C. to 250° C. with vacuum residues from the tube passage of the fifth three-stream winding-tube heat exchanger at a temperature of 265° C. to 305° C. and returned vacuum residues from the tube passage of the fifth three-stream winding-tube heat exchanger at a temperature of 265° C. to 305° C., the mass flow ratio of the first desalted crude oil I to the returned vacuum residues to the vacuum residues is 1:0.35-0.6:0.05-0.2; the second desalted crude oil II firstly enters the shell passage of the fourth two-stream winding-tube heat exchanger and exchanges heat to 140° C. to 180° C. with vacuum second-line and second-medium oil from the tube passage of the fourth three-stream winding-tube heat exchanger at a temperature of 160° C. to 200° C. and vacuum third-line and third-medium oil from the tube passage of the fifth two-stream winding-tube heat exchanger at a temperature of 220° C. to 265° C., the mass flow ratio of the second desalted crude oil II to the vacuum second-line and second-medium oil to the vacuum third-line and third-medium oil is 1:0.9-1.3:0.05-0.2; the second desalted crude oil II from the fourth two-stream winding-tube heat exchanger enters the shell passage of the fourth three-stream winding-tube heat exchanger and exchanges heat to 200° C. to 250° C. with atmospheric second-line oil from the second pipeline on the bottom of the atmospheric stripping tower at a temperature of 240° C. to 280° C., atmospheric third-line oil from the tube passage of the fifth three-stream winding-tube heat exchanger at a temperature of 275° C. to 315° C. and vacuum second-line and second-medium oil from the fourth circulating return pipeline in the middle portion of the vacuum tower at a temperature of 230° C. to 270° C., the mass flow ratio of the second desalted crude oil II to the atmospheric second-line oil to the atmospheric third-line oil to the vacuum second-line and second-medium oil is 1:0.1-0.3:0.1-0.3:0.9-1.3; and the first desalted crude oil I from the shell passage of the third two-stream winding-tube heat exchanger and the second desalted crude oil II from the shell passage of the fourth three-stream winding-tube heat exchanger are merged into one stream of desalted crude oil and then enter the primary distillation tower or flash tower for preliminary fractionation;

primary bottom oil or flash bottom oil at a temperature of 200° C. to 250° C. is extracted from the bottom of the primary distillation tower or flash tower, and the mass flow ratio of the merged desalted crude oil to the primary bottom oil or flash bottom oil is 1:1.6-1.95; the primary bottom oil or flash bottom oil firstly enters the shell passage of the fifth two-stream winding-tube heat exchanger and exchanges heat to 250° C. to 280° C. with vacuum third-line and third-medium oil from the tube passage of the fifth three-stream winding-tube heat exchanger at a temperature of 260° C. to 300° C. and atmospheric second-medium oil from the second circulating return pipeline in the middle portion of the atmospheric tower at a temperature of 260° C. to 300° C., the mass flow ratio of the primary bottom oil or flash bottom oil to the vacuum third-line and third-medium oil to the atmospheric second-medium oil is 1:0.3-0.6:0.5-0.7; the primary bottom oil or flash bottom oil from the fifth two-stream winding-tube heat exchanger enters the shell passage of the fifth three-stream winding-tube heat exchanger and exchanges heat to 280° C. to 320° C. with vacuum third-line and third-medium oil from the third circulating return pipeline in the lower portion of the vacuum tower at a temperature of 310° C. to 350° C., vacuum residues from the tube passage of the second single-stream winding-tube heat exchanger at a temperature of 300° C. to 340° C. and atmospheric third-line oil from the third lateral line in the middle portion of the atmospheric tower at a temperature of 300° C. to 340° C., the mass flow ratio of the primary bottom oil or flash bottom oil to the vacuum third-line and third-medium oil to the vacuum residues to the atmospheric third-line oil is 1:0.3-0.6:0.25-0.45:0.05-0.15; and the primary bottom oil or flash bottom oil from the fifth three-stream winding-tube heat exchanger enters the shell passage of the second single-stream winding-tube heat exchanger and exchanges heat to 300° C. to 330° C. with vacuum residues from the vacuum residue pipeline on the bottom of the vacuum tower at a temperature of 350° C. to 400° C., the mass flow ratio of the primary bottom oil or flash bottom oil to the vacuum residues is 1:0.25-0.45;

the primary bottom oil or flash bottom oil from the shell passage of the second single-stream winding-tube heat exchanger is successively delivered to the atmospheric furnace, the atmospheric tower, the vacuum furnace and the vacuum tower for atmospheric and vacuum heat exchange.

Compared with the prior art, the present invention has the following advantages. The heat exchangers are configured as winding-tube heat exchangers, N first tube boxes and N second tube boxes are designed in the winding-tube heat exchangers, the heat exchange tubes in the same layer of spiral tubes is divided into N groups, and each group of heat exchange tubes is distributed in the first and second tube boxes, that is, a plurality of heat exchange tubes in each layer of spiral tubes are disposed in each of the first and second tube boxes. In this way, the tube passage is divided into N flow passages, and the flow passage operate independently, so that a certain flow passage or some flow passages can be flexibly and independently separated for cleaning, maintenance or the like, and it is unnecessary to stop the whole device. In addition, when some of the first and second tube boxes are closed, the remaining first and second tube boxes can operate normally. Meanwhile, when the tube-pass medium is low in flow, it can be ensured that the tube-pass medium operates at the optimal flow rate by closing several first and second tube boxes, so that dirt cannot be quickly formed on the tube wall at a low heat load. That is, to adapt to the adjustment mode of load fluctuation, some tube boxes are closed at a low load (for example, ½ of the tube boxes can be closed at 50% load), thereby ensuring that the accumulation of dirt is prevented at the optimal flow rate. At a full load, some tube boxes are closed to flush the remaining tube boxes at a high flow rate, so that each tube box is washed and cleaned by cyclic switching. In this way, the failed heat exchange device can be simply and quickly handled, and the loss of heat exchanger is reduced.

By configuring the winding-tube heat exchangers to comprise combinations of single-stream winding-tube heat exchangers, two-stream winding-tube heat exchangers and three-stream winding-tube heat exchangers, 64 ordinary heat exchangers in the existing crude oil heat exchange network can be replaced with a few of winding-tube heat exchangers, so that the whole heat exchange system is simple in structure and low in loss during the heat exchange process, and can reduce the equipment investment and the floor space.

In addition, the heat exchange process for exchanging heat by using the heat exchange system of the present application can effectively reduce the heat loss during the heat exchange process.

DETAILED DESCRIPTION OF THE INVENTION

Figure 1:
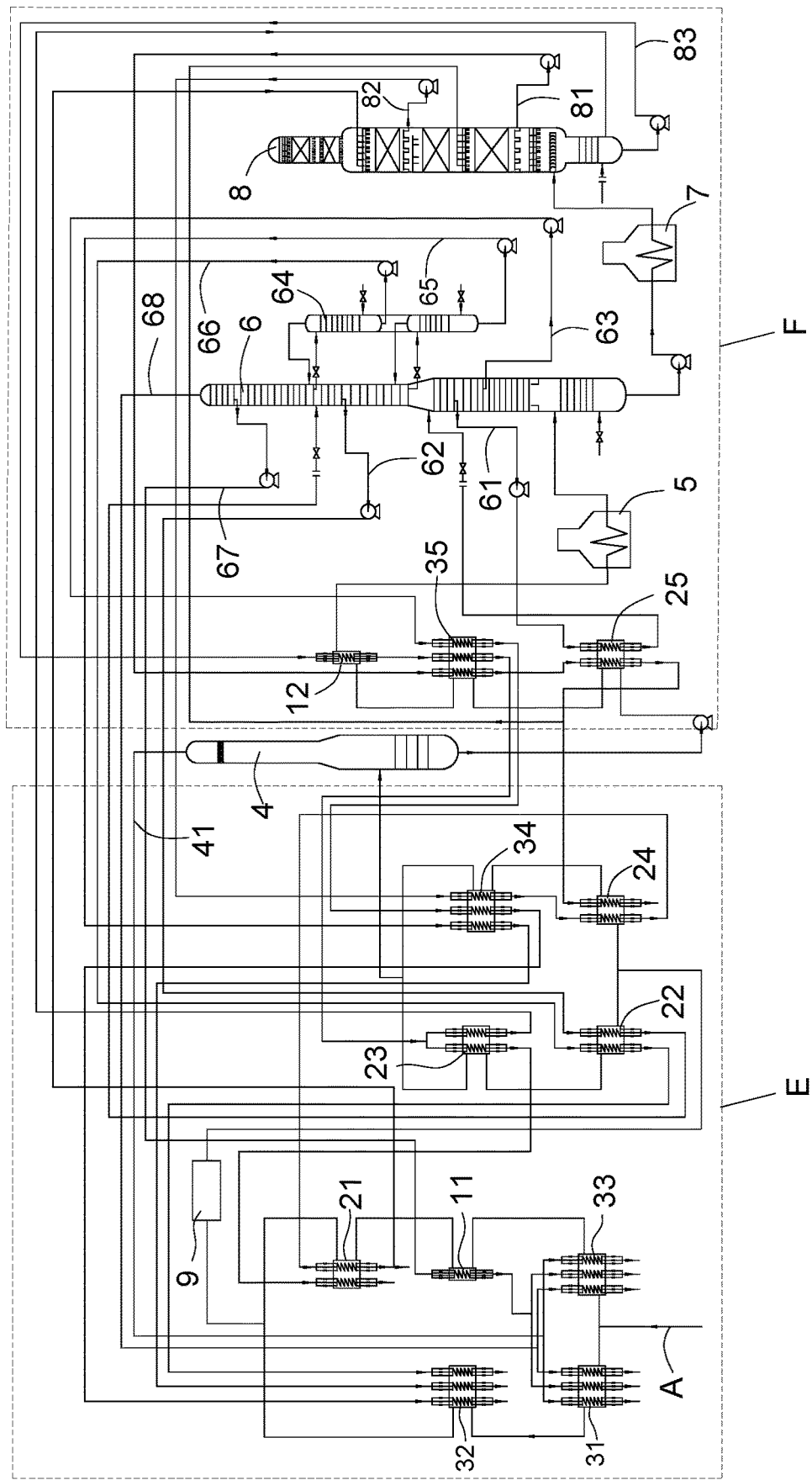
FIG. 1 is a flowchart of an atmospheric-vacuum heat exchange system according to an embodiment of the present invention.
Figure 2:
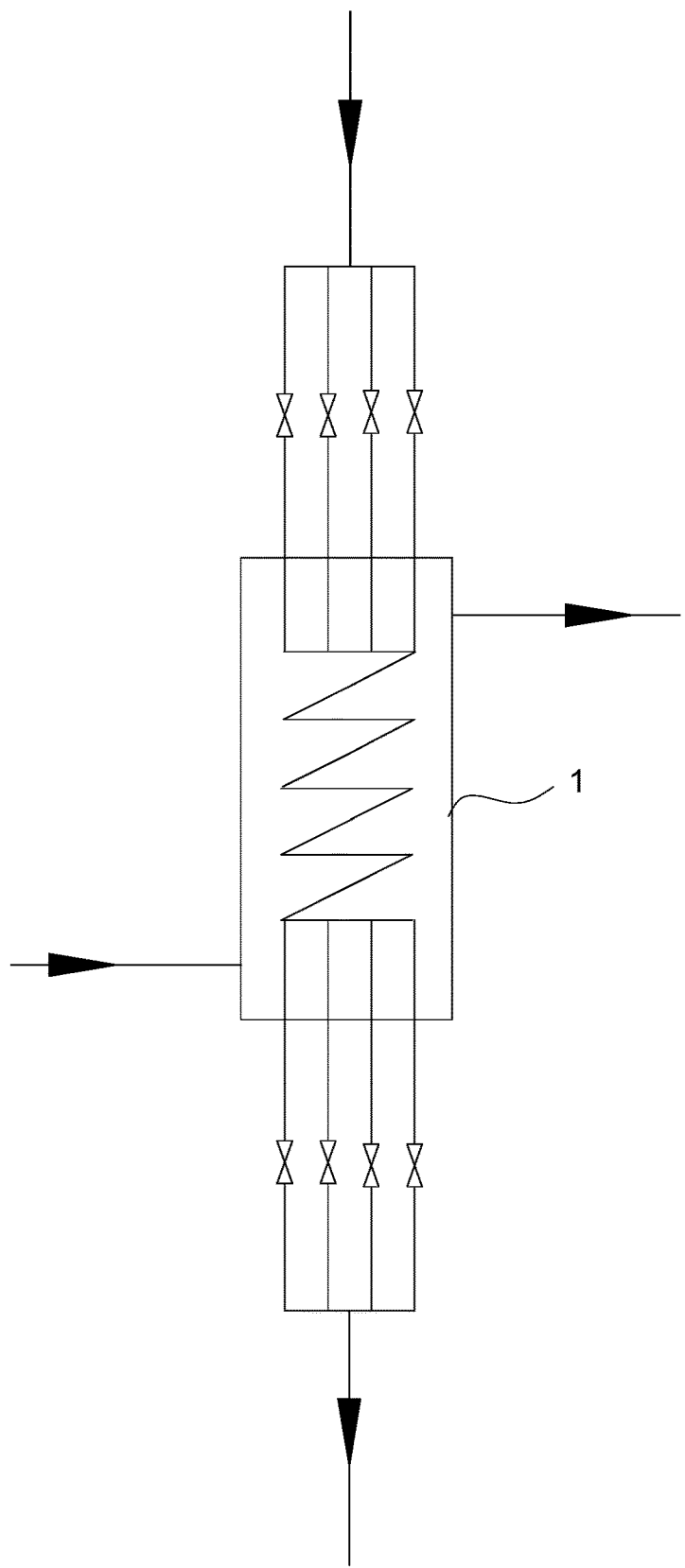
FIG. 2 is a schematic diagram of a single-stream winding-tube heat exchanger according to the embodiment of the present invention.
Figure 3:
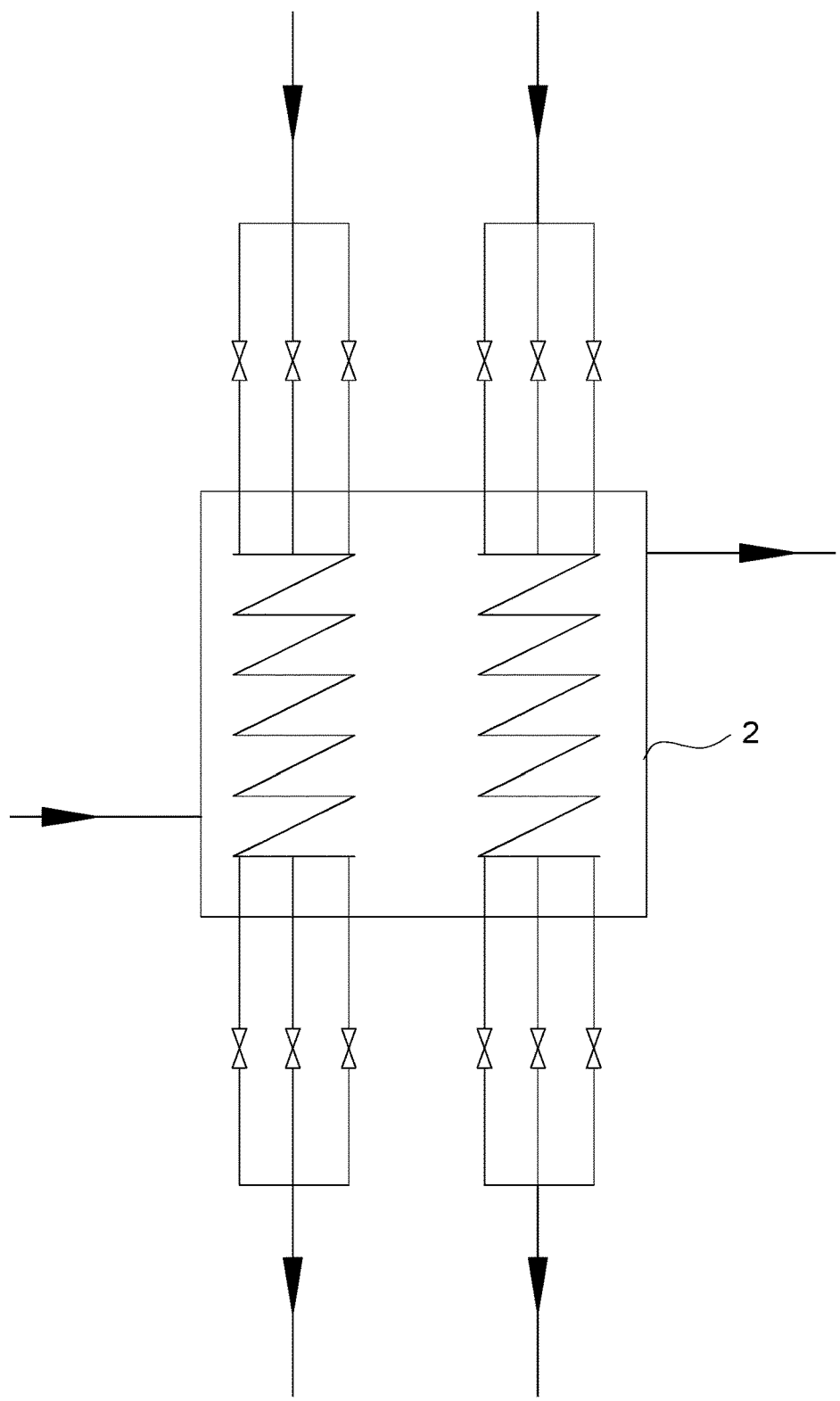
FIG. 3 is a schematic diagram of a two-stream winding-tube heat exchanger according to the embodiment of the present invention.
Figure 4:
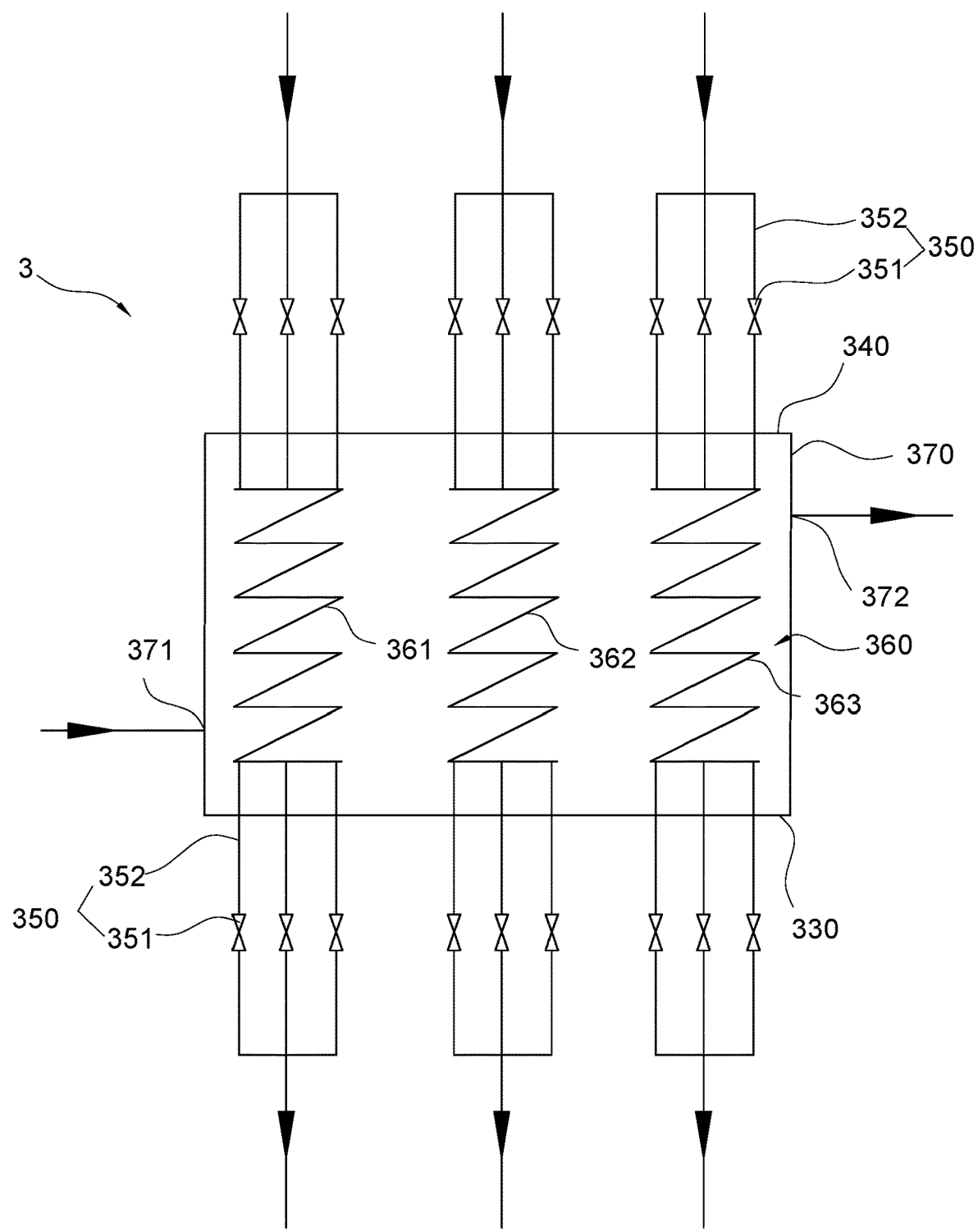
FIG. 4 is a schematic diagram of a three-stream winding-tube heat exchanger according to the embodiment of the present invention.
Figure 5:
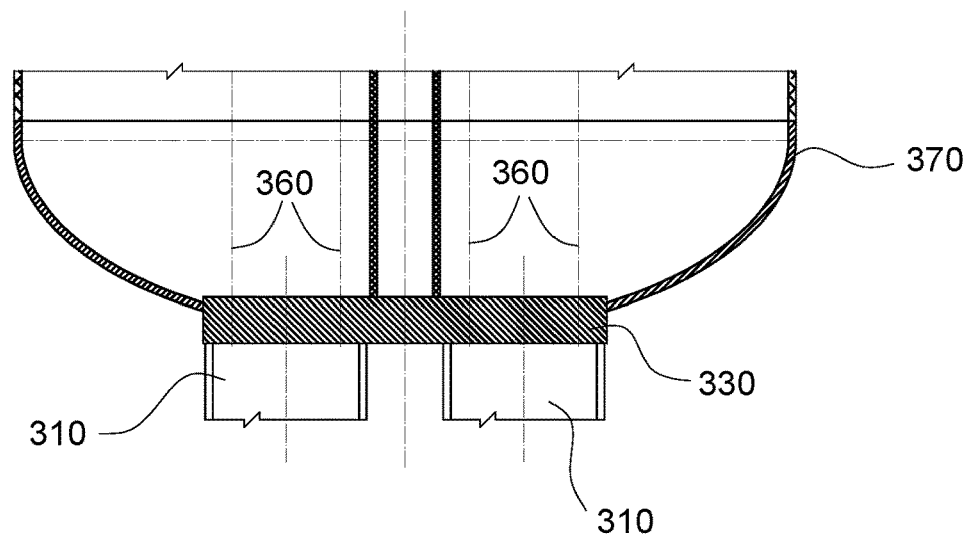
FIG. 5 is a sectional view of a part of the three-stream winding-tube heat exchanger illustrating a plurality of first tube boxes and a first tube plate according to the embodiment of the present invention.
Figure 6:
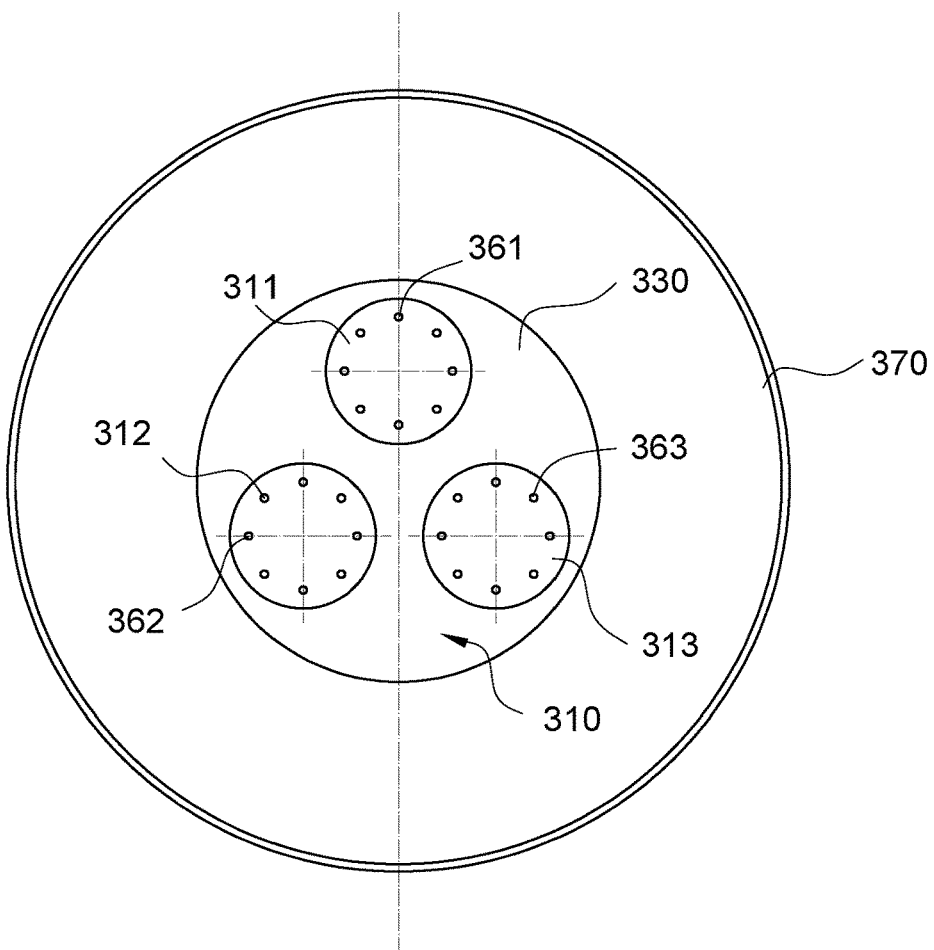
FIG. 6 is a bottom view of the three-stream winding-tube heat exchanger according to the embodiment of the present invention.
Figure 7:
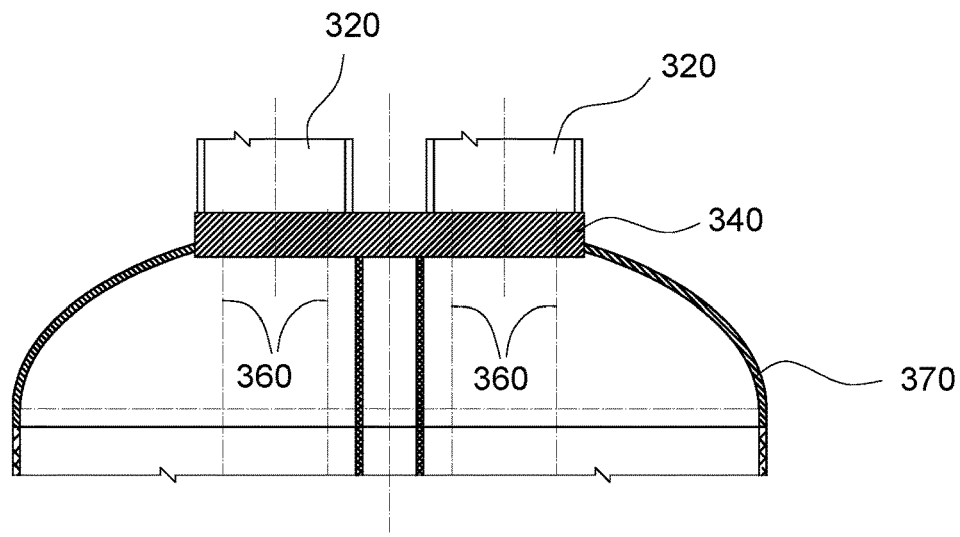
FIG. 7 is a sectional view of a part of the three-stream winding-tube heat exchanger illustrating a plurality of second tube boxes and a second tube plate according to the embodiment of the present invention.
Figure 8:
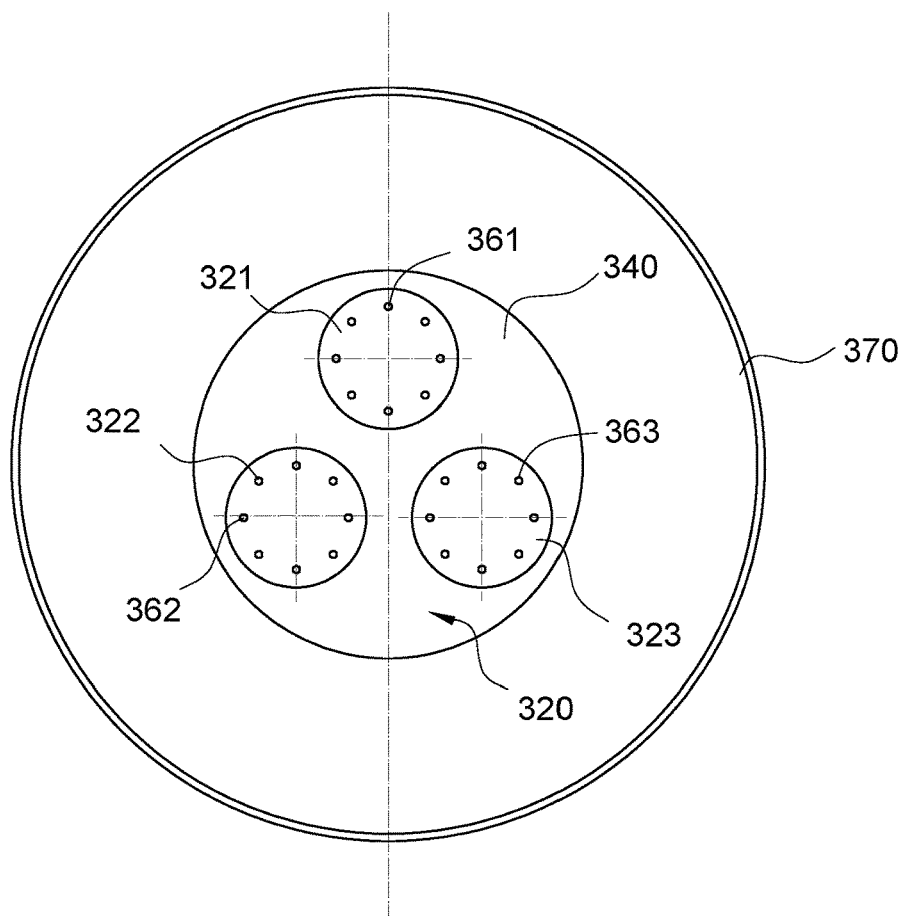
FIG. 8 is a top view of the three-stream winding-tube heat exchanger according to the embodiment of the present invention.

The present invention will be further described in detail below by embodiments with reference to the accompanying drawings.

FIGS. 1-10 show a preferred embodiment of an atmospheric-vacuum hat exchange system with a winding-tube heat exchanger and a heat exchange process according to the present invention. The atmospheric-vacuum heat exchange system comprises a first heat exchanging group with a crude oil output for performing primary heat exchange on crude oil; a primary distillation tower 4 or flash tower for performing primary distillation on the crude oil (the primary distillation tower is used in this embodiment, and the following description is given by taking the primary distillation tower as an example; of course, the flash tower can also be used, and the position pipeline connection structure of the flash tower in the whole heat exchange system are the same those of the primary distillation tower as long as the crude oil passes through the flash tower and the flash bottom tower is discharged from the bottom of the flash tower, so it will not be repeated herein) connected to the crude oil output of the first heat exchanging group; a second heat exchanging group for performing secondary heat exchange on a primary bottom oil or flash bottom oil obtained after primary distillation being connected to a bottom of the primary distillation tower 4 or flash tower, having a primary bottom oil output or a flash bottom oil output; an atmospheric furnace 5, connected to the primary bottom oil output or flash bottom oil output of the second heat exchanging group; an atmospheric tower 6; a vacuum furnace 7; and a vacuum tower 8 connected to the vacuum furnace; the atmospheric tower 6 is connected between the atmospheric furnace 5 and the vacuum furnace 7, the vacuum furnace 7 is connected between the atmospheric tower 6 and the vacuum tower 8; the crude oil or the primary bottom oil or flash bottom oil from the primary distillation tower 4 or flash tower or/and the atmospheric tower 6 or/and the vacuum tower 8 is inputted into the first heat exchanging group and the second heat exchanging group according to required working conditions, so as to heat the crude oil, and to heat the primary bottom oil or flash bottom oil.

The heat exchangers in the first heat exchanging group and the second heat exchanging group are winding-tube heat exchangers. Each winding-tube heat exchanger is vertically arranged (of course, it can also be horizontal arranged), and comprises a shell-pass cylinder 370 having two ends; a first shell-pass connecting tube 371 and a second shell-pass connecting tube 372 both connected to the shell-pass cylinder 370; a first tube plate 330 and a second tube plate 340 respectively attached to each end of the shell-pass cylinder 370; a plurality of first tube box 310 connected to the first tube plate 330; a plurality of second tube box 320 connected to the second tube plate 340; a plurality of heat exchange tubes 360 each having two ends disposed inside the shell-pass cylinder 370; wherein, a shell passage for the crude oil or the primary bottom oil or flash bottom oil to flow through is formed by the first shell-pass connecting tube 371, the second shell-pass connecting tube 372 and the shell-pass cylinder 370; two ends of each heat exchange tube 360 are respectively connected to the first tube plate 330 and the second tube plate 340, and respectively communicated with the corresponding first tube box 310 and the corresponding second tube box 320, to form a plurality of tube passages for the crude oil or the primary bottom oil or flash bottom oil to pass through; each heat exchange tube 360 is spirally wounded along the axial direction of the shell-pass cylinder 370 with multiple spiral tube layers, and each spiral tube layer has a plurality of wounded heat exchanging tubes; the number of the plurality of first tube box 310 is N, and each first tube box 310 in the plurality of tube box is independently disposed on the first tube plate 330; the number of the plurality of second tube box 320 is N, and each second tube box 320 in the plurality of second box is corresponding to the first tube box 310 and independently disposed on the second tube plate 340; each spiral tube layer has N group(s) of the wounded heat exchange tubes 360, and two ends of each group of the heat exchange tubes 360 are respectively connected to the corresponding first and second tube boxes 310, 320; and N is a natural number greater than or equal to 1.

In this embodiment, the winding-tube heat exchanger has a plurality of single-stream winding-tube heat exchangers 1, two-stream winding-tube heat exchangers 2 and three-stream winding-tube heat exchangers 3; the single-stream winding-tube heat exchanger 1 is defined as a heat exchanger having one shell passage and one tube passage when N=1; the two-stream winding-tube heat exchanger 2 is defined as a heat exchanger having one shell passage and two tube passages when N=2; and the three-stream winding-tube heat exchanger 3 is defined as a heat exchanger having one shell passage and three tube passages when N=3.

Now, taking the three-stream winding-tube heat exchanger 3 as an example, here is detail described:

As shown in FIGS. 4-8, each three-stream winding-tube heat exchanger 3 comprises a shell-pass cylinder 370, a first tube plate 330, a second tube plate 340, a plurality of first tube boxes 310, a plurality of second tube boxes 320 and a plurality of heat exchange tubes 360. A first shell-pass connecting tube 371 and a second shell-pass connecting tube 372 are connected to the shell-pass cylinder 370. There are three first tube boxes 310, that is, a first tube box I 311, a first tube box II 312 and a first tube box III 313, respectively. The first tube boxes 310 are uniformly and independently distributed on the first tube plate 330. There are also three second tube boxes 320 corresponding to the first tube boxes 310, that is, a second tube box I 321 corresponding to the first tube box I 311, a second tube box II 322 corresponding to the first tube box II 312, and a second tube box III 323 corresponding to the first tube box III 313, respectively. The second tube boxes 320 are uniformly and independently distributed on the second tube plate 340. In order to adjust the flow and shut off the tube-pass medium, each first and second tube box 310, 320 has an opening, and a plurality of valves 351 are respectively disposed adjacent to the opening of each first and second tube box 310, 320. In this embodiment, a plurality of flow distribution devices 350 are respectively disposed adjacent to the opening of each first and second tube box 310, 320, and each flow distribution device 350 comprises three or four flow distribution passages 352 and the valves 351, each valve 351 is disposed on each flow distribution passage 352.

In this embodiment, the distribution structure of the heat exchange tubes 360 in the first and second tube boxes is described below. The tube exchange tubes 360 in the same layer of spiral tubes is divided into three groups, and the heat exchange tubes in each group are uniformly distributed along the same layer of spiral tubes (of course, in actual working conditions, when the number of heat exchange tubes in the same layer of spiral tubes cannot be exactly divided by the number of groups to be divided, the heat exchange tubes in the same layer of spiral tubes cannot be exactly divided into N groups uniformly, and the heat exchange tubes in each group cannot be exactly distributed in the same layer of spiral tubes uniformly, so that it can be designed according to actual working conditions, thereby avoiding the derivation of the shell-pass medium as far as possible after some tube boxes are stopped. Of course, the above uniform distribution mode is preferred). Two ends of the first group of heat exchange tubes 361 are respectively distributed in the first tube box I 311 and the second tube box I 321; two ends of the second group of heat exchange tubes 362 are respectively distributed in the first tube box II 312 and the second tube box II 322; and two ends of the third group of heat exchange tubes 363 are respectively distributed in the first tube box III 313 and the second tube box III 323. The heat exchange tubes in each layer of spiral tubes are distributed according to the above rule. In this way, the heat exchange tubes 360 are uniformly distributed in the tube boxes, and each group of heat exchange tubes 360 is disposed independently. When the tube boxes corresponding to one or more groups of heat exchange tubes 360 are closed, other groups of heat exchange tubes 360 can still operate normally. During normal operation, the tube-pass medium enters from the operating first tube boxes 310, then flows through the corresponding heat exchange tubes 360 and flows out from the second tube boxes 320; and the shell-pass medium enters from the first shell-pass connecting tube 371, exchanges heat with the tube-pass medium in the heat exchange tubes 360 and flows out from the second shell-pass connecting tube 372.

Therefore, in this embodiment, the heat exchangers can control the operation of the flow distribution passages 352 by turning on or off the valves 351 and cooperate with the first and second tube boxes and the heat exchange tubes, so that the flow change of the heat exchange tube corresponding to a certain flow distribution passage caused by the flow change of this flow distribution passage will not result in the deviation of the shell-pass medium and affect heat transfer.

In addition, after scaling occurs in the tube pass, when flushing at a high flow rate is not effective, the cleaning of the separated tube boxes by load can be reduced (it is unnecessary to stop working and the optimal flow rate of the tube pass is ensured). That is, when dirt is obviously formed in the tube passage during the operation process of heat exchangers to affect the heat exchange performances or result in the rise of the pressure drop of the system, the heat load can be appropriately reduced to realize online cleaning, that is, one group of first and second tube boxes is separated for cleaning (for the separated part, each tube box can be washed by the medium at a relatively high flow rate, so that the dirt adhered to the tube wall is washed out by a large impact force; and, mechanical cleaning or chemical cleaning can be performed separately without affecting the normal operation of heat exchange tubes in the remaining tube boxes. During online washing at a high flow rate, since the number of heat exchange tubes corresponding to this group of first and second tube boxes is ⅓ of the total number of heat exchange tubes, it can be realized at the same flow that the washing flow rate is three times of the designed flow rate, so it is more advantageous to remove dirt in the tube passage). After this group of first and second tube boxes is cleaned and put into use, another group of first and second tube boxes is separated for cleaning until the heat exchange tubes in all tube boxes are cleaned. The normal operation of the heat exchange tubes 360 corresponding to the remaining first and second tube boxes will not be affected during the cleaning process. Therefore, the winding-tube heat exchangers in this embodiment can realize that some heat exchange tubes are cleaned without stopping the device by only reducing the load, and the remaining heat exchange tubes continue to operate. Of course, during online washing, two or more groups of first and second tube boxes can be closed for cleaning.

The structures of the single-stream winding-tube heat exchanger and the two-stream winding-tube heat exchangers can refer to the three-stream winding-tube heat exchanger and will not be repeated herein.

Figure 9:
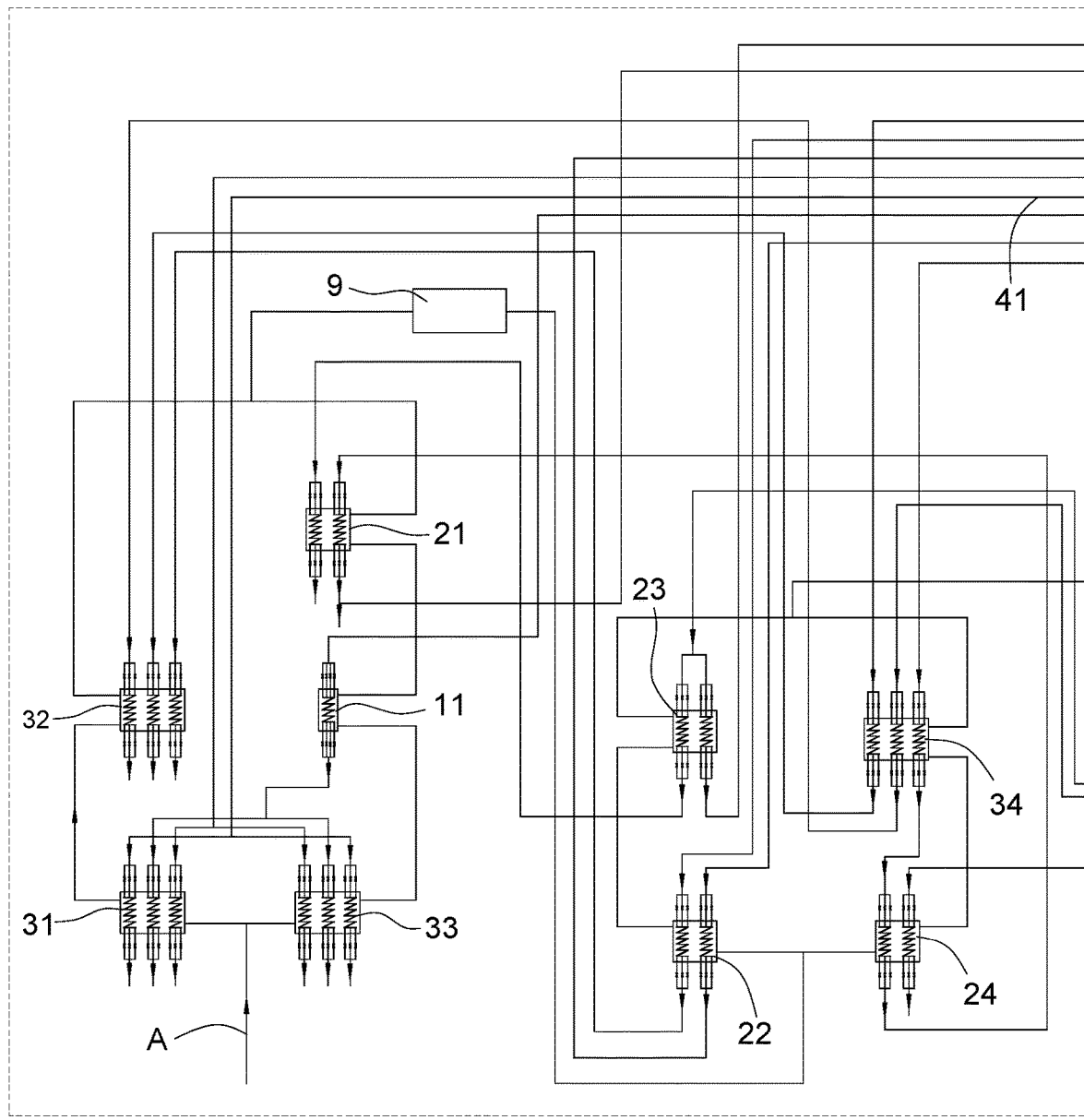
FIG. 9 is an enlarged view of Part-E in FIG. 1.
Figure 10:
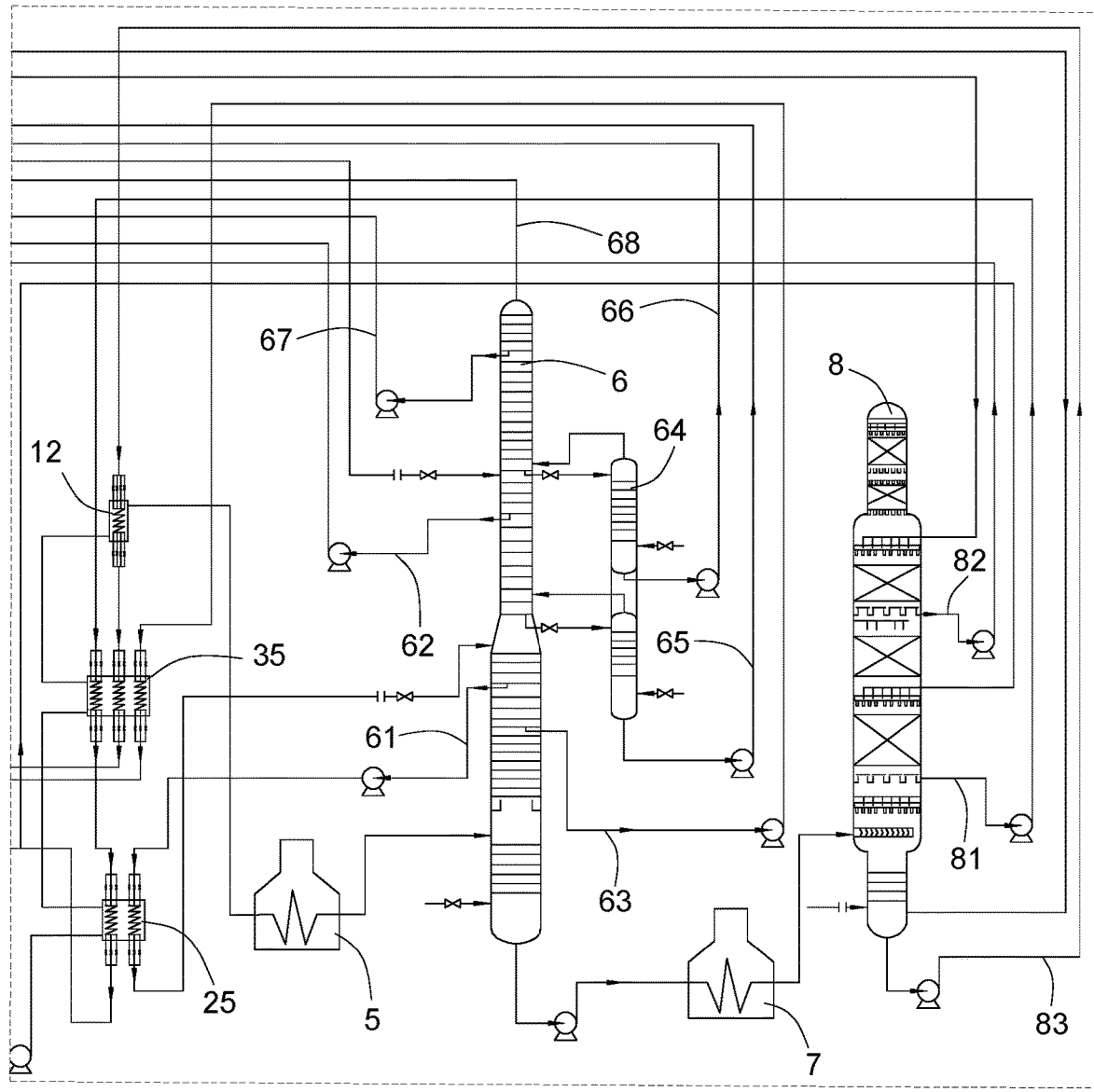
FIG. 10 is an enlarged view of Part-F in FIG. 1.

As shown in FIGS. 1, 9 and 10, since the crude oil generally contains salt, in order to remove salt in the crude oil, the atmospheric-vacuum heat exchange system further comprises an electric desalting unit 9. The connections among the first heat exchanging group, the electric desalting unit 9, the primary distillation tower 4 or flash tower, the second heat exchanging group, the atmospheric furnace 5, the atmospheric tower 6, the vacuum furnace 7 and the vacuum tower 8 are as follows.

The first heat exchanging group comprises a first three-stream winding-tube heat exchanger 31, a second three-stream winding-tube heat exchanger 32, a third three-stream winding-tube heat exchanger 33, a first single-stream winding-tube heat exchanger 11, a first two-stream winding-tube heat exchanger 21, a second two-stream winding-tube heat exchanger 22, a third two-stream winding-tube heat exchanger 23, a fourth two-stream winding-tube heat exchanger 24 and a fourth three-stream winding-tube heat exchanger 34.

The second heat exchanging group comprises a fifth two-stream winding-tube heat exchanger 25, a fifth three-stream winding-tube heat exchanger 35 and a second single-stream winding-tube heat exchanger 12.

A pipe A used for feeding the crude oil is divided into two sections, the first section of the pipe A is successively connected to the shell passage of the first three-stream winding-tube heat exchanger 31 and the shell passage of the second three-stream winding-tube heat exchanger 32, and the second section of the pipe A is successively connected to the shell passage of the third three-stream winding-tube heat exchanger 33, the shell passage of the first single-stream winding-tube heat exchanger 11 and the shell passage of the first two-stream winding-tube heat exchanger 21; the pipes from the shell passage of the second three-stream winding-tube heat exchanger 32 and the shell passage of the first two-stream winding-tube heat exchanger 21 are merged to form one pipe and then connected to the electric desalting unit 9; the pipe from the electric desalting unit 9 is divided into two pipes, the first pipe is successively connected to the shell passage of the second two-stream winding-tube heat exchanger 22 and the shell passage of the third two-stream winding-tube heat exchanger 23, and the second pipe is successively connected to the shell passage of the fourth two-stream winding-tube heat exchanger 24 and the shell passage of the fourth three-stream winding-tube heat exchanger 34; the pipes from the shell of the third two-stream winding-tube heat exchanger 23 and the shell passage of the fourth three-stream winding-tube heat exchanger 34 are merged into one pipe and then connected to the primary distillation tower 4; the pipe from the primary distillation tower 4 is successively connected to the shell passage of the fifth two-stream winding-tube heat exchanger 25, the shell passage of the fifth three-stream winding-tube heat exchanger 35 and the shell passage of the second single-stream winding-tube heat exchanger 12; and the pipe from the shell passage of the second single-stream winding-tube heat exchanger 12 is connected to the atmospheric furnace 5, the atmospheric tower 6 connected between the atmospheric furnace 5 and the vacuum furnace 7, the vacuum furnace 7 connected between the atmospheric tower 6 and the vacuum tower 8. Specifically, the pipe from the shell passage of the second single-stream winding-tube heat exchanger 12 is connected to the lateral inlet of the atmospheric tower 6 through the atmospheric furnace 5, and the bottom outlet of the atmospheric tower 6 is connected to the lateral inlet of the vacuum tower 8 through the vacuum furnace 7.

A top pipeline 41 of the primary distillation tower 4 is divided into two pipes respectively connected to the tube passage of the first three-stream winding-tube heat exchanger 31 and the tube passage of the third three-stream winding-tube heat exchanger 33.

A second circulating return pipeline 61 in the middle portion of the atmospheric tower 6 is connected to the tube passage of the fifth two-stream winding-tube heat exchanger 25 and then returns to the atmospheric tower 6.

A first circulating return pipeline 62 in the middle portion of the atmospheric tower 6 is connected to the tube passage of the second two-stream winding-tube heat exchanger 22 and then returns to the atmospheric tower 6.

A third lateral line 63 in the middle portion of the atmospheric tower 6 is successively connected to the tube passage of the fifth three-stream winding-tube heat exchanger 35, the tube passage of the fourth three-stream winding-tube heat exchanger 34 and the tube passage of the second three-stream winding-tube heat exchanger 32, and then connected to the downstream.

The middle portion of the atmospheric tower 6 is connected to an atmospheric stripping tower 64, a second pipeline 65 on the bottom of the atmospheric stripping tower 64 is successively connected to the tube passage of the fourth three-stream winding-tube heat exchanger 34 and the tube passage of the second three-stream winding-tube heat exchanger 32 and then connected to the downstream, and a first lateral line 66 in the middle portion of the atmospheric stripping tower 64 is successively connected to the tube passage of the second two-stream winding-tube heat exchanger 22 and the tube passage of the second three-stream winding-tube heat exchanger 32 and then connected to the downstream.

A second lateral line 67 in the upper portion of the atmospheric tower 6 is connected to the tube passage of the first single-stream winding-tube heat exchanger 11, the pipe from the first single-steam winding-tube heat exchanger 11 is divided into two pipes, the first pipe is connected to the tube passage of the first three-stream winding-tube heat exchanger 31, and the second pipe is connected to the tube passage of the third three-stream winding-tube heat exchanger 33 and then connected to the downstream.

A first pipeline 68 on the top of the atmospheric tower 6 is divided into two pipes respectively connected to the tube passage of the first three-stream winding-tube heat exchanger 31 and the tube passage of the third three-stream winding-tube heat exchanger 33 and then connected to the downstream.

A third circulating return pipeline 81 in the lower portion of the vacuum tower 8 is successively connected to the tube passage of the fifth three-stream winding-tube heat exchanger 35 and the tube passage of the fifth two-stream winding-tube heat exchanger 25, and the pipe from the tube passage of the fifth two-stream winding-tube heat exchanger 25 is divided into two pipes, one of which is connected to the tube passage of the fourth two-stream winding-tube heat exchanger 24 and then connected to the downstream and the other one of which returns to the vacuum tower 8.

A fourth circulating return pipeline 82 in the middle portion of the vacuum tower 8 is successively connected to the tube passage of the fourth three-stream winding-tube heat exchanger 34, the tube passage of the fourth two-stream winding-tube heat exchanger 24 and the tube passage of the first two-stream winding-tube heat exchanger 21, and the pipe from the tube passage of the first two-stream winding-tube heat exchanger 21 is divided into two pipes, one of which is connected to the downstream and the other one of which returns to the vacuum tower 8.

A vacuum residue pipeline 83 on the bottom of the vacuum tower 8 is successively connected to the tube passage of the second single-stream winding-tube heat exchanger 12 and the tube passage of the fifth three-stream winding-tube heat exchanger 35, and the pipe from the tube passage of the fifth three-stream winding-tube heat exchanger 35 is divided into two pipes, one of which is connected to one tube passage of the third two-stream winding-tube heat exchanger 23, then to the tube passage of the first two-stream winding-tube heat exchanger 21 and to the downstream, and the other one of which is connected to the other tube passage of the third two-stream winding-tube heat exchanger 23 and returns to the vacuum tower 8.

A heat exchange process for exchanging heat by using the atmospheric-vacuum heat exchange system in this embodiment includes the following steps.

Crude oil from the outside at a temperature of 20° C. to 60° C. is fed into a pipe A and then divided into two parts, a first-section crude oil I and a second-section crude oil II, the mass flow ratio of the first-section crude oil I to the second-section crude oil II is 1:0.8-1.2; the first-section crude oil I firstly enters the shell passage of the first three-stream winding-tube heat exchanger 31 and exchanges heat to 80° C. to 110° C. with primary top oil gas from the top pipeline 41 of the primary distillation tower 4 at a temperature of 100° C. to 140° C., atmospheric top circulating oil from the tube passage of the first single-stream winding-tube heat exchanger 11 at a temperature of 110° C. to 150° C. and atmospheric top oil gas from the first pipeline 68 on the top of the atmospheric tower 6 at a temperature of 100° C. to 150° C., the mass flow ratio of the first-section crude oil I to the atmospheric top oil gas to the atmospheric top circulating oil to the primary top oil gas being 1:0.1-0.3:0.25-0.4:0.06-0.2; the first-section crude oil I from the first three-stream winding-tube heat exchanger 31 enters the shell passage of the second three-stream winding-tube heat exchanger 32 and exchanges heat to 120° C. to 155° C. with atmospheric third-line oil from the tube passage of the fourth three-stream winding-tube heat exchanger 34 at a temperature of 180° C. to 220° C., atmospheric second-line oil from the tube passage of the fourth three-stream winding-tube heat exchanger 34 at a temperature of 160° C. to 200° C. and atmospheric first-line oil from the tube passage of the second two-stream winding-tube heat exchanger 22 at a temperature of 130° C. to 170° C., the mass flow ratio of the first-section crude oil I to the atmospheric third-line oil to the atmospheric second-line oil to the atmospheric first-line oil is 1:0.1-0.3:0.1-0.3:0.15-0.35; the second-section crude oil II firstly enters the shell passage of the third three-stream winding-tube heat exchanger 33 and exchanges heat to 80° C. to 110° C. with primary top oil gas from the top pipeline 41 of the primary distillation tower 4 at a temperature of 100° C. to 140° C., atmospheric top circulating oil from the tube passage of the first single-stream winding-tube heat exchanger 11 at a temperature of 110° C. to 150° C. and atmospheric top oil gas from the first pipeline 68 on the top of the atmospheric tower 6 at a temperature of 100° C. to 150° C., the mass flow ratio of the second-section crude oil II to the atmospheric top oil gas to the atmospheric top circulating oil to the primary top oil gas is 1:0.1-0.3:0.25-0.4:0.06-0.2; the second-section crude oil II from the third three-stream winding-tube heat exchanger 33 enters the shell passage of the first single-stream winding-tube heat exchanger 11 and exchanges heat to 100° C. to 130° C. with atmospheric top circulating oil from the second lateral line 67 in the upper portion of the atmospheric tower 6 at a temperature of 130° C. to 180° C., the mass flow ratio of the second-section crude oil II to the atmospheric top circulating oil being 1:0.5-0.8; the second-section crude oil II from the first single-stream winding-tube heat exchanger 11 enters the shell passage of the first two-stream winding-tube heat exchanger 21 and exchanges heat to 120° C. to 150° C. from vacuum residues from the tube passage of the third two-stream winding-tube heat exchanger 23 at a temperature of 170° C. to 210° C. and vacuum second-line and second-medium oil from the tube passage of the fourth two-stream winding-tube heat exchanger 24 at a temperature of 145° C. to 185° C., the mass flow ratio of the second-section crude oil II to the vacuum residues to the vacuum second-line and second-medium oil being 1:0.5-0.7:0.9-1.3; and the first-section crude oil I from the shell passage of the second three-stream winding-tube heat exchanger 32 and the second-section oil from the shell passage of the first two-stream winding-tube heat exchanger 21 are merged into one stream of crude oil at a temperature of 120° C. to 150° C. and then enter the electric desalting unit 9 so that salt and water in the crude oil are removed.

The desalted crude oil from the electric desalting unit 9 has a temperature of 120° C. to 150° C., and the mass flow ratio of the merged crude oil before entering the electric desalting unit 9 and the desalted crude oil is 1:0.95-1.05; the desalted crude oil is divided into two parts, a first desalted crude oil I and a second desalted crude oil II, the flow mass ratio of the first desalted crude oil I to the second desalted crude oil II is 1:0.8-1.2; the first desalted crude oil I firstly enters the shell passage of the second two-stream winding-tube heat exchanger 22 and exchanges heat to 145° C. to 185° C. with atmospheric first-line oil from the first lateral line 66 in the middle portion of the atmospheric stripping tower 64 at a temperature of 170° C. to 210° C. and atmospheric first-medium oil from the first circulating return pipeline 62 in the middle portion of the atmospheric tower 6 at a temperature of 210° C. to 250° C., the mass flow ratio of the first desalted crude oil I to the atmospheric first-line oil to the atmospheric first-medium oil is 1:0.1-0.3:0.2-0.4; the first desalted crude oil I from the second two-stream winding-tube heat exchanger 22 enters the shell passage of the third two-stream winding-tube heat exchanger 23 and exchanges heat to 190° C. to 250° C. with vacuum residues from the tube passage of the fifth three-stream winding-tube heat exchanger 35 at a temperature of 265° C. to 305° C. and returned vacuum residues from the tube passage of the fifth three-stream winding-tube heat exchanger 35 at a temperature of 265° C. to 305° C., the mass flow ratio of the first desalted crude oil I to the returned vacuum residues to the vacuum residues is 1:0.35-0.6:0.05-0.2; the second desalted crude oil II firstly enters the shell passage of the fourth two-stream winding-tube heat exchanger 24 and exchanges heat to 140° C. to 180° C. with vacuum second-line and second-medium oil from the tube passage of the fourth three-stream winding-tube heat exchanger 34 at a temperature of 160° C. to 200° C. and vacuum third-line and third-medium oil from the tube passage of the fifth two-stream winding-tube heat exchanger 25 at a temperature of 220° C. to 265° C., the mass flow ratio of the second desalted crude oil II to the vacuum second-line and second-medium oil to the vacuum third-line and third-medium oil is 1:0.9-1.3:0.05-0.2; the second desalted crude oil II from the fourth two-stream winding-tube heat exchanger 24 enters the shell passage of the fourth three-stream winding-tube heat exchanger 34 and exchanges heat to 200° C. to 250° C. with atmospheric second-line oil from the second pipeline 65 on the bottom of the atmospheric stripping tower 64 at a temperature of 240° C. to 280° C., atmospheric third-line oil from the tube passage of the fifth three-stream winding-tube heat exchanger 35 at a temperature of 275° C. to 315° C. and vacuum second-line and second-medium oil from the fourth circulating return pipeline 82 in the middle portion of the vacuum tower 8 at a temperature of 230° C. to 270° C., the mass flow ratio of the second desalted crude oil II to the atmospheric second-line oil to the atmospheric third-line oil to the vacuum second-line and second-medium oil is 1:0.1-0.3:0.1-0.3:0.9-1.3; and the first desalted crude oil I from the shell passage of the third two-stream winding-tube heat exchanger 23 and the second desalted crude oil II from the shell passage of the fourth three-stream winding-tube heat exchanger 34 are merged into one stream of desalted crude oil and then enter the primary distillation tower 4 for preliminary fractionation.

Primary bottom oil at a temperature of 200° C. to 250° C. is extracted from the bottom of the primary distillation tower 4, and the mass flow ratio of the merged desalted crude oil to the primary bottom oil is 1:1.6-1.95; the primary bottom oil firstly enters the shell passage of the fifth two-stream winding-tube heat exchanger 25 and exchanges heat to 250° C. to 280° C. with vacuum third-line and third-medium oil from the tube passage of the fifth three-stream winding-tube heat exchanger 35 at a temperature of 260° C. to 300° C. and atmospheric second-medium oil from the second circulating return pipeline 61 in the middle portion of the atmospheric tower 6 at a temperature of 260° C. to 300° C., the mass flow ratio of the primary bottom oil to the vacuum third-line and third-medium oil to the atmospheric second-medium oil is 1:0.3-0.6:0.5-0.7; the primary bottom oil from the fifth two-stream winding-tube heat exchanger 25 enters the shell passage of the fifth three-stream winding-tube heat exchanger 35 and exchanges heat to 280° C. to 320° C. with vacuum third-line and third-medium oil from the third circulating return pipeline 81 in the lower portion of the vacuum tower 8 at a temperature of 310° C. to 350° C., vacuum residues from the tube passage of the second single-stream winding-tube heat exchanger 12 at a temperature of 300° C. to 340° C. and atmospheric third-line oil from the third lateral line 63 in the middle portion of the atmospheric tower 6 at a temperature of 300° C. to 340° C., the mass flow ratio of the primary bottom oil to the vacuum third-line and third-medium oil to the vacuum residues to the atmospheric third-line oil is 1:0.3-0.6:0.25-0.45:0.05-0.15; and the primary bottom oil from the fifth three-stream winding-tube heat exchanger 35 enters the shell passage of the second single-stream winding-tube heat exchanger 12 and exchanges heat to 300° C. to 330° C. with vacuum residues from the vacuum residue pipeline 83 on the bottom of the vacuum tower 8 at a temperature of 350° C. to 400° C., the mass flow ratio of the primary bottom oil to the vacuum residues is 1:0.25-0.45.

The primary bottom oil from the shell passage of the second single-stream winding-tube heat exchanger 12 is successively delivered to the atmospheric furnace 5, the atmospheric tower 6, the vacuum furnace 7 and the vacuum tower 8 for atmospheric and vacuum heat exchange. Specifically, the primary bottom oil flowing from the shell passage of the second single-stream winding-tube heat exchanger 12 flows into the lateral inlet of the atmospheric tower 6 through the atmospheric furnace 5 and is then fractionated in the atmospheric tower 6, and the atmospheric bottom oil flowing from the bottom outlet of the atmospheric tower 6 flows into the lateral inlet of the vacuum tower 8 through the vacuum furnace 7 and is further fractionated in the vacuum tower 8.

The invention claimed is:

1. An atmospheric-vacuum heat exchange system with a winding-tube heat exchanger, comprising:
   a first heat exchanging group with a crude oil output for performing primary heat exchange on crude oil;
   a primary distillation tower (4) or flash tower, for performing primary distillation on the crude oil, connected to the crude oil output of the first heat exchanging group;
   a second heat exchanging group for performing secondary heat exchange on a primary bottom oil or flash bottom oil obtained after primary distillation being connected to a bottom of the primary distillation tower (4) or flash tower, having a primary bottom oil output or a flash bottom oil output;
   an atmospheric furnace (5), connected to the primary bottom oil output or flash bottom oil output of the second heat exchanging group;
   an atmospheric tower (6);
   a vacuum furnace (7); and
   a vacuum tower (8) connected to the vacuum furnace;
   wherein,
   the atmospheric tower (6) is connected between the atmospheric furnace (5) and the vacuum furnace (7), the vacuum furnace (7) is connected between the atmospheric tower (6) and the vacuum tower (8);
   the crude oil or the primary bottom oil or flash bottom oil from the primary distillation tower (4) or flash tower or/and the atmospheric tower (6) or/and the vacuum tower (8) is inputted into the first heat exchanging group and the second heat exchanging group according to required working conditions, so as to heat the crude oil, and to heat the primary bottom oil or flash bottom oil;
   heat exchangers in the first heat exchanging group and/or the second heat exchanging group are winding-tube heat exchangers, each winding-tube heat exchanger comprises:
   a shell-pass cylinder (370) having two ends;
   a first shell-pass connecting tube (371) and a second shell-pass connecting tube (372) both connected to the shell-pass cylinder (370);

a first tube plate (330) and a second tube plate (340) respectively attached to each end of the shell-pass cylinder (370);

a plurality of first tube box (310) connected to the first tube plate (330);

a plurality of second tube box (320) connected to the second tube plate (340);

a plurality of heat exchange tubes (360) each having two ends disposed inside the shell-pass cylinder (370);

wherein, a shell passage for the crude oil or the primary bottom oil or flash bottom oil to flow through is formed by the first shell-pass connecting tube (371), the second shell-pass connecting tube (372) and the shell-pass cylinder (370);

two ends of each heat exchange tube (360) are respectively connected to the first tube plate (330) and the second tube plate (340), and respectively communicated with the corresponding first tube box (310) and the corresponding second tube box (320), to form a plurality of tube passages for the crude oil or the primary bottom oil or flash bottom oil to pass through;

each heat exchange tube (360) is spirally wounded along the axial direction of the shell-pass cylinder (370) with multiple spiral tube layers, and each spiral tube layer has a plurality of wounded heat exchanging tubes;

the number of the plurality of tube box (310) is N, and each first tube box (310) in the plurality of tube box is independently disposed on the first tube plate (330);

the number of the plurality of second tube box (320) is N, and each second tube box (320) in the plurality of second box is corresponding to the first tube box (310) and independently disposed on the second tube plate (340);

each spiral tube layer has N group(s) of the wounded heat exchange tubes (360), and two ends of each group of the heat exchange tubes (360) are respectively connected to the corresponding first and second tube boxes (310, 320); and N is a natural number greater than or equal to 1.

2. The atmospheric-vacuum heat exchange system of claim 1, wherein each first and second tube box (310, 320) has an opening, and a plurality of valves (351) are respectively disposed adjacent to the opening of each first and second tube box (310, 320).

3. The atmospheric-vacuum heat exchange system of claim 2, wherein a plurality of flow distribution devices (350) are respectively disposed adjacent to the opening of each first and second tube box (310, 320), and each flow distribution device (350) comprises three or four flow distribution passages (352) and the valves (351), each valve (351) is disposed on each flow distribution passage (352).

4. The atmospheric-vacuum heat exchange system of claim 1, wherein the plurality of first tube box (310) is uniformly distributed on the first tube plate (330), and the plurality of second tube box (320) is uniformly distributed on the second tube plate (340).

5. The atmospheric-vacuum heat exchange system of claim 1, wherein the heat exchange tubes (360) in each spiral tube layer are uniformly divided into N groups.

6. The atmospheric-vacuum heat exchange system of claim 1, wherein after the heat exchange tubes (360) in each spiral tube layer are divided into N groups, each group of heat exchange tubes (360) is uniformly distributed in the same spiral tube layer.

7. The atmospheric-vacuum heat exchange system of claim 1, wherein the winding-tube heat exchangers (the heat exchangers in the first heat exchanging group and/or the second heat exchanging group) have a plurality of single-stream winding-tube heat exchangers (1), two-stream winding-tube heat exchangers (2) and three-stream winding-tube heat exchangers (3);

the single-stream winding-tube heat exchangers (1) are heat exchangers having one shell passage and one tube passage when N=1;

the two-stream winding-tube heat exchangers (2) are heat exchangers having one shell passage and two tube passages when N=2; and the three-stream winding-tube heat exchangers (3) are heat exchangers having one shell passage and three tube passages when N=3.

8. The atmospheric-vacuum heat exchange system of claim 7, further comprising an electric desalting unit (9);

the connections among the first heat exchanging group, the electric desalting unit (9), the primary distillation tower (4) or flash tower, the second heat exchanging group, the atmospheric furnace (5), the atmospheric tower (6), the vacuum furnace (7) and the vacuum tower (8) are as follows:

the first heat exchanging group comprises a first three-stream winding-tube heat exchanger (31), a second three-stream winding-tube heat exchanger (32), a third three-stream winding-tube heat exchanger (33), a first single-stream winding-tube heat exchanger (11), a first two-stream winding-tube heat exchanger (21), a second two-stream winding-tube heat exchanger (22), a third two-stream winding-tube heat exchanger (23), a fourth two-stream winding-tube heat exchanger (24) and a fourth three-stream winding-tube heat exchanger (34);

the second heat exchanging group comprises a fifth two-stream winding-tube heat exchanger (25), a fifth three-stream winding-tube heat exchanger (35) and a second single-stream winding-tube heat exchanger (12);

a pipe (A) used for feeding the crude oil is divided into two sections, the first section of the pipe (A) is successively connected to the shell passage of the first three-stream winding-tube heat exchanger (31) and the shell passage of the second three-stream winding-tube heat exchanger (32), and the second section of the pipe (A) is successively connected to the shell passage of the third three-stream winding-tube heat exchanger (33), the shell passage of the first single-stream winding-tube heat exchanger (11) and the shell passage of the first two-stream winding-tube heat exchanger (21);

the pipes from the shell passage of the second three-stream winding-tube heat exchanger (32) and the shell passage of the first two-stream winding-tube heat exchanger (21) are merged to form one pipe and then connected to the electric desalting unit (9);

the pipe from the electric desalting unit (9) is divided into two pipes, the first pipe is successively connected to the shell passage of the second two-stream winding-tube heat exchanger (22) and the shell passage of the third two-stream winding-tube heat exchanger (23), and the second pipe is successively connected to the shell passage of the fourth two-stream winding-tube heat exchanger (24) and the shell passage of the fourth three-stream winding-tube heat exchanger (34);

the pipes from the shell of the third two-stream winding-tube heat exchanger (23) and the shell passage of the fourth three-stream winding-tube heat exchanger (34) are merged into one pipe and then connected to the primary distillation tower (4) or flash tower;

the pipe from the primary distillation tower (4) or flash tower is successively connected to the shell passage of the fifth two-stream winding-tube heat exchanger (25), the shell passage of the fifth three-stream winding-tube heat exchanger (35) and the shell passage of the second single-stream winding-tube heat exchanger (12); and the pipe from the shell passage of the second single-stream winding-tube heat exchanger (12) is connected to the atmospheric furnace (5), the atmospheric tower (6) connected between the atmospheric furnace (5) and the vacuum furnace (7), the vacuum furnace (7) connected between the atmospheric tower (6) and the vacuum tower (8);

the top pipeline (41) of the primary distillation tower (4) or flash tower is divided into two pipes respectively connected to the tube passage of the first three-stream winding-tube heat exchanger (31) and the tube passage of the third three-stream winding-tube heat exchanger (33);

a second circulating return pipeline (61) in the middle portion of the atmospheric tower (6) is connected to the tube passage of the fifth two-stream winding-tube heat exchanger (25) and then returns to the atmospheric tower (6);

a first circulating return pipeline (62) in the middle portion of the atmospheric tower (6) is connected to the tube passage of the second two-stream winding-tube heat exchanger (22) and then returns to the atmospheric tower (6);

a third lateral line (63) in the middle portion of the atmospheric tower (6) is successively connected to the tube passage of the fifth three-stream winding-tube heat exchanger (35), the tube passage of the fourth three-stream winding-tube heat exchanger (34) and the tube passage of the second three-stream winding-tube heat exchanger (32), and then connected to the downstream;

the middle portion of the atmospheric tower (6) is connected to an atmospheric stripping tower (64), a second pipeline (65) on the bottom of the atmospheric stripping tower (64) is successively connected to the tube passage of the fourth three-stream winding-tube heat exchanger (34) and the tube passage of the second three-stream winding-tube heat exchanger (32) and then connected to the downstream, and a first lateral line (66) in the middle portion of the atmospheric stripping tower (64) is successively connected to the tube passage of the second two-stream winding-tube heat exchanger (22) and the tube passage of the second three-stream winding-tube heat exchanger (32) and then connected to the downstream;

a second lateral line (67) in the upper portion of the atmospheric tower (6) is connected to the tube passage of the first single-stream winding-tube heat exchanger (11), the pipe from the first single-steam winding-tube heat exchanger (11) is divided into two pipes, the first pipe is connected to the tube passage of the first three-stream winding-tube heat exchanger (31), and the second pipe is connected to the tube passage of the third three-stream winding-tube heat exchanger (33) and then connected to the downstream;

a first pipeline (68) on the top of the atmospheric tower (6) is divided into two pipes respectively connected to the tube passage of the first three-stream winding-tube heat exchanger (31) and the tube passage of the third three-stream winding-tube heat exchanger (33) and then connected to the downstream;

a third circulating return pipeline (81) in the lower portion of the vacuum tower (8) is successively connected to the tube passage of the fifth three-stream winding-tube heat exchanger (35) and the tube passage of the fifth two-stream winding-tube heat exchanger (25), and the pipe from the tube passage of the fifth two-stream winding-tube heat exchanger (25) is divided into two pipes, one of which is connected to the tube passage of the fourth two-stream winding-tube heat exchanger (24) and then connected to the downstream and the other one of which returns to the vacuum tower (8);

a fourth circulating return pipeline (82) in the middle portion of the vacuum tower (8) is successively connected to the tube passage of the fourth three-stream winding-tube heat exchanger (34), the tube passage of the fourth two-stream winding-tube heat exchanger (24) and the tube passage of the first two-stream winding-tube heat exchanger (21), and the pipe from the tube passage of the first two-stream winding-tube heat exchanger (21) is divided into two pipes, one of which is connected to the downstream and the other one of which returns to the vacuum tower (8); and a vacuum residue pipeline (83) on the bottom of the vacuum tower (8) is successively connected to the tube passage of the second single-stream winding-tube heat exchanger (12) and the tube passage of the fifth three-stream winding-tube heat exchanger (35), and the pipe from the tube passage of the fifth three-stream winding-tube heat exchanger (35) is divided into two pipes, one of which is connected to one tube passage of the third two-stream winding-tube heat exchanger (23), then to the tube passage of the first two-stream winding-tube heat exchanger (21) and to the downstream, and the other one of which is connected to the other tube passage of the third two-stream winding-tube heat exchanger (23) and returns to the vacuum tower (8).

9. A heat exchange process for exchanging heat by using the atmospheric-vacuum heat exchange system of claim 8, wherein crude oil from the outside at a temperature of 20° C. to 60° C. is fed into a pipe (A) and then divided into two parts, a first-section crude oil I and a second-section crude oil II, the mass flow ratio of the first-section crude oil I to the second-section crude oil II is 1:0.8-1.2;

the first-section crude oil I firstly enters the shell passage of the first three-stream winding-tube heat exchanger (31) and exchanges heat to 80° C. to 110° C. with primary top oil gas from the top pipeline (41) of the primary distillation tower (4) or flash tower at a temperature of 100° C. to 140° C., atmospheric top circulating oil from the tube passage of the first single-stream winding-tube heat exchanger (11) at a temperature of 110° C. to 150° C. and atmospheric top oil gas from the first pipeline (68) on the top of the atmospheric tower (6) at a temperature of 100° C. to 150° C., the mass flow ratio of the first-section crude oil I to the atmospheric top oil gas to the atmospheric top circulating oil to the primary top oil gas being 1:0.1-0.3:0.25-0.4:0.06-0.2;

the first-section crude oil I from the first three-stream winding-tube heat exchanger (31) enters the shell passage of the second three-stream winding-tube heat exchanger (32) and exchanges heat to 120° C. to 155° C. with atmospheric third-line oil from the tube passage of the fourth three-stream winding-tube heat exchanger (34) at a temperature of 180° C. to 220° C., atmospheric second-line oil from the tube passage of the fourth three-stream winding-tube heat exchanger (34) at a temperature of 160° C. to 200° C. and atmospheric first-line oil from the tube passage of the second two-stream winding-tube heat exchanger (22) at a temperature of 130° C. to 170° C., the mass flow ratio of the first-section crude oil I to the atmospheric third-line oil to the atmospheric second-line oil to the atmospheric first-line oil is 1:0.1-0.3:0.1-0.3:0.15-0.35;

the second-section crude oil II firstly enters the shell passage of the third three-stream winding-tube heat exchanger (33) and exchanges heat to 80° C. to 110° C. with primary top oil gas from the top pipeline (41) of the primary distillation tower (4) or flash tower at a temperature of 100° C. to 140° C., atmospheric top circulating oil from the tube passage of the first single-stream winding-tube heat exchanger (11) at a temperature of 110° C. to 150° C. and atmospheric top oil gas from the first pipeline (68) on the top of the atmospheric tower (6) at a temperature of 100° C. to 150° C., the mass flow ratio of the second-section crude oil II to the atmospheric top oil gas to the atmospheric top circulating oil to the primary top oil gas is 1:0.1-0.3:0.25-0.4:0.06-0.2;

the second-section crude oil II from the third three-stream winding-tube heat exchanger (33) enters the shell passage of the first single-stream winding-tube heat exchanger (11) and exchanges heat to 100° C. to 130° C. with atmospheric top circulating oil from the second lateral line (67) in the upper portion of the atmospheric tower (6) at a temperature of 130° C. to 180° C., the mass flow ratio of the second-section crude oil II to the atmospheric top circulating oil being 1:0.5-0.8;

the second-section crude oil II from the first single-stream winding-tube heat exchanger (11) enters the shell passage of the first two-stream winding-tube heat exchanger (21) and exchanges heat to 120° C. to 150° C. from vacuum residues from the tube passage of the third two-stream winding-tube heat exchanger (23) at a temperature of 170° C. to 210° C. and vacuum second-line and second-medium oil from the tube passage of the fourth two-stream winding-tube heat exchanger (24) at a temperature of 145° C. to 185° C., the mass flow ratio of the second-section crude oil II to the vacuum residues to the vacuum second-line and second-medium oil being 1:0.5-0.7:0.9-1.3; and the first-section crude oil I from the shell passage of the second three-stream winding-tube heat exchanger (32) and the second-section oil from the shell passage of the first two-stream winding-tube heat exchanger (21) are merged into one stream of crude oil at a temperature of 120° C. to 150° C. and then enter the electric desalting unit (9) so that salt and water in the crude oil are removed;

the desalted crude oil from the electric desalting unit (9) has a temperature of 120° C. to 150° C., and the mass flow ratio of the merged crude oil before entering the electric desalting unit (9) and the desalted crude oil is 1:0.95-1.05;

the desalted crude oil is divided into two parts, a first desalted crude oil I and a second desalted crude oil II, the flow mass ratio of the first desalted crude oil I to the second desalted crude oil II is 1:0.8-1.2;

the first desalted crude oil I firstly enters the shell passage of the second two-stream winding-tube heat exchanger (22) and exchanges heat to 145° C. to 185° C. with atmospheric first-line oil from the first lateral line (66) in the middle portion of the atmospheric stripping tower (64) at a temperature of 170° C. to 210° C. and atmospheric first-medium oil from the first circulating return pipeline (62) in the middle portion of the atmospheric tower (6) at a temperature of 210° C. to 250° C., the mass flow ratio of the first desalted crude oil I to the atmospheric first-line oil to the atmospheric first-medium oil is 1:0.1-0.3:0.2-0.4;

the first desalted crude oil I from the second two-stream winding-tube heat exchanger (22) enters the shell passage of the third two-stream winding-tube heat exchanger (23) and exchanges heat to 190° C. to 250° C. with vacuum residues from the tube passage of the fifth three-stream winding-tube heat exchanger (35) at a temperature of 265° C. to 305° C. and returned vacuum residues from the tube passage of the fifth three-stream winding-tube heat exchanger (35) at a temperature of 265° C. to 305° C., the mass flow ratio of the first desalted crude oil I to the returned vacuum residues to the vacuum residues is 1:0.35-0.6:0.05-0.2;

the second desalted crude oil II firstly enters the shell passage of the fourth two-stream winding-tube heat exchanger (24) and exchanges heat to 140° C. to 180° C. with vacuum second-line and second-medium oil from the tube passage of the fourth three-stream winding-tube heat exchanger (34) at a temperature of 160° C. to 200° C. and vacuum third-line and third-medium oil from the tube passage of the fifth two-stream winding-tube heat exchanger (25) at a temperature of 220° C. to 265° C., the mass flow ratio of the second desalted crude oil II to the vacuum second-line and second-medium oil to the vacuum third-line and third-medium oil is 1:0.9-1.3:0.05-0.2;

the second desalted crude oil II from the fourth two-stream winding-tube heat exchanger (24) enters the shell passage of the fourth three-stream winding-tube heat exchanger (34) and exchanges heat to 200° C. to 250° C. with atmospheric second-line oil from the second pipeline (65) on the bottom of the atmospheric stripping tower (64) at a temperature of 240° C. to 280° C., atmospheric third-line oil from the tube passage of the fifth three-stream winding-tube heat exchanger (35) at a temperature of 275° C. to 315° C. and vacuum second-line and second-medium oil from the fourth circulating return pipeline (82) in the middle portion of the vacuum tower (8) at a temperature of 230° C. to 270° C., the mass flow ratio of the second desalted crude oil II to the atmospheric second-line oil to the atmospheric third-line oil to the vacuum second-line and second-medium oil is 1:0.1-0.3:0.1-0.3:0.9-1.3; and the first desalted crude oil I from the shell passage of the third two-stream winding-tube heat exchanger (23) and the second desalted crude oil II from the shell passage of the fourth three-stream winding-tube heat exchanger (34) are merged into one stream of desalted crude oil and then enter the primary distillation tower (4) or flash tower for preliminary fractionation;

primary bottom oil or flash bottom oil at a temperature of 200° C. to 250° C. is extracted from the bottom of the primary distillation tower (4) or flash tower, and the mass flow ratio of the merged desalted crude oil to the primary bottom oil or flash bottom oil is 1:1.6-1.95;

the primary bottom oil or flash bottom oil firstly enters the shell passage of the fifth two-stream winding-tube heat exchanger (25) and exchanges heat to 250° C. to 280° C. with vacuum third-line and third-medium oil from the tube passage of the fifth three-stream winding-tube heat exchanger (35) at a temperature of 260° C. to 300°

C. and atmospheric second-medium oil from the second circulating return pipeline (61) in the middle portion of the atmospheric tower (6) at a temperature of 260° C. to 300° C., the mass flow ratio of the primary bottom oil or flash bottom oil to the vacuum third-line and third-medium oil to the atmospheric second-medium oil is 1:0.3-0.6:0.5-0.7;

the primary bottom oil or flash bottom oil from the fifth two-stream winding-tube heat exchanger (25) enters the shell passage of the fifth three-stream winding-tube heat exchanger (35) and exchanges heat to 280° C. to 320° C. with vacuum third-line and third-medium oil from the third circulating return pipeline (81) in the lower portion of the vacuum tower (8) at a temperature of 310° C. to 350° C., vacuum residues from the tube passage of the second single-stream winding-tube heat exchanger (12) at a temperature of 300° C. to 340° C. and atmospheric third-line oil from the third lateral line (63) in the middle portion of the atmospheric tower (6) at a temperature of 300° C. to 340° C., the mass flow ratio of the primary bottom oil or flash bottom oil to the vacuum third-line and third-medium oil to the vacuum residues to the atmospheric third-line oil is 1:0.3-0.6: 0.25-0.45:0.05-0.15; and the primary bottom oil or flash bottom oil from the fifth three-stream winding-tube heat exchanger (35) enters the shell passage of the second single-stream winding-tube heat exchanger (12) and exchanges heat to 300° C. to 330° C. with vacuum residues from the vacuum residue pipeline (83) on the bottom of the vacuum tower (8) at a temperature of 350° C. to 400° C., the mass flow ratio of the primary bottom oil or flash bottom oil to the vacuum residues is 1:0.25-0.45; and the primary bottom oil or flash bottom oil from the shell passage of the second single-stream winding-tube heat exchanger (12) is successively delivered to the atmospheric furnace (5), the atmospheric tower (6), the vacuum furnace (7) and the vacuum tower (8) for atmospheric and vacuum heat exchange.

\* \* \* \* \*